US012728348B2

(12) United States Patent
Liu

(10) Patent No.: US 12,728,348 B2
(45) Date of Patent: Sep. 8, 2026

(54) MOTION PROCESSING METHOD AND APPARATUS IN VIRTUAL SCENE, DEVICE, STORAGE MEDIUM, AND PROGRAM PRODUCT

(71) Applicant: Tencent Technology (Shenzhen) Company Limited, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 295 days.

(21) Appl. No.: 18/214,313

(22) Filed: Jun. 26, 2023

(65) Prior Publication Data

US 2023/0330525 A1 Oct. 19, 2023

Related U.S. Application Data

(63) Continuation of application No. PCT/CN2022/128165, filed on Oct. 28, 2022.

(30) Foreign Application Priority Data

Jan. 21, 2022 (CN) ......................... 202210072160.1

(51) Int. Cl.
*A63F 13/42* (2014.01)
*A63F 13/533* (2014.01)
*A63F 13/837* (2014.01)

(52) U.S. Cl.
CPC ............ *A63F 13/42* (2014.09); *A63F 13/533* (2014.09); *A63F 13/837* (2014.09)

(58) Field of Classification Search
CPC ....................................................... A63F 13/42
See application file for complete search history.

(56) References Cited

U.S. PATENT DOCUMENTS

2001/0041617 A1 11/2001 Matsui et al.
2021/0236932 A1* 8/2021 Perez ...................... G06T 13/40
(Continued)

FOREIGN PATENT DOCUMENTS

CN 105194871 A 12/2015
CN 108635853 A 10/2018
(Continued)

OTHER PUBLICATIONS

Trident, "5 *New* Season 1 Settings! COD Mobile Movement & Patch Notes Explained CODM Season 1 2022," Jan. 19, 2022, available at https://www.youtube.com/watch?v=hH62E5YsX1c&t=119s (Year: 2022).*
(Continued)

*Primary Examiner* — Jay Trent Liddle
(74) *Attorney, Agent, or Firm* — Morgan, Lewis & Bockius LLP

(57) ABSTRACT

This application provides a motion processing method in a virtual scene performed by an electronic device, a non-transitory computer-readable storage medium, and a computer program product. The method includes: displaying a virtual scene including a climbable obstacle, a virtual object, and an operation control, the operation control being associated with at least two triggering operations for controlling the virtual object to move over the climbable obstacle in at least two different motion manners; in response to a triggering operation performed on the operation control, determining a target motion manner corresponding to the triggering operation when a distance between the virtual object and the climbable obstacle is less than a target distance; and controlling the virtual object to move over the climbable obstacle in the target motion manner corresponding to the triggering operation.

20 Claims, 11 Drawing Sheets

(56) References Cited

U.S. PATENT DOCUMENTS

| | | | | |
|---|---|---|---|---|
| 2022/0258055 | A1* | 8/2022 | Sato | A63F 13/56 |
| 2024/0293731 | A1* | 9/2024 | Tong | A63F 13/55 |

FOREIGN PATENT DOCUMENTS

| | | | |
|---|---|---|---|
| CN | 108905198 | A | 11/2018 |
| CN | 109350964 | A | 2/2019 |
| CN | 111068324 | A | 4/2020 |
| CN | 111659107 | A | 9/2020 |
| CN | 113244604 | A | 8/2021 |
| CN | 113350779 | A | 9/2021 |
| CN | 113559516 | A | 10/2021 |
| CN | 113713372 | A | 11/2021 |
| CN | 114425159 | A | 5/2022 |
| JP | 2017035214 | A | 2/2017 |

OTHER PUBLICATIONS

Tencent Technology, WO, PCT/CN2022/128165, Jan. 12, 2023, 4 pgs.

Wandoujia.com (Xian Tong), "Why Does Player Unknown's Battlegrounds 2 Mobile Need to Separate the Jump Key and the Vault Key?", Aug. 2021, Retrieved from the Internet: https://www.wandoujia.com/apps/8173717/11773640136261568677.html.

Tencent Technology (Shenzhen) Company Limited, ISR, PCT/CN2022/128165, Jan. 12, 2023, 3 pgs.

Tencent Technology, Japanese Office Action, JP Patent Application No. 2024-524482, Apr. 16, 2025, 7 pgs.

Callofduty.Jp, "COD Mobile: How to View the Screen", Oct. 2019, Retrieved from the Internet: https://callofduty.jp/mobile/interface/.

X.com, @tmatoboykun, "CoD Mobile Leak Information/Ace", Jan. 2022, Retrieved from the Internet: https://x.com/tmatoboykun/status/1484015667863232512.

* cited by examiner

MOTION PROCESSING METHOD AND APPARATUS IN VIRTUAL SCENE, DEVICE, STORAGE MEDIUM, AND PROGRAM PRODUCT

CROSS-REFERENCE TO RELATED APPLICATIONS

This application is a continuation application of PCT Patent Application No. PCT/CN2022/128165, entitled "MOTION PROCESSING METHOD AND APPARATUS IN VIRTUAL SCENE, DEVICE, STORAGE MEDIUM, AND PROGRAM PRODUCT" filed on Oct. 28, 2022, which claims priority to Chinese Patent Application No. 202210072160.1, entitled "MOTION PROCESSING METHOD AND APPARATUS IN VIRTUAL SCENE, DEVICE, STORAGE MEDIUM, AND PROGRAM PRODUCT" filed on Jan. 21, 2022, all of which is incorporated by reference in its entirety.

FIELD OF THE TECHNOLOGY

This application relates to a human-computer interaction technology, in particular to, a motion processing method and apparatus in a virtual scene, a device, a non-transitory computer-readable storage medium, and a computer program product.

BACKGROUND OF THE DISCLOSURE

A graphic processing hardware-based human-computer interaction technology for virtual scenes can achieve diverse interactions between virtual objects controlled by users or artificial intelligence according to practical application needs, and has a broad practical value. For example, in game applications, a fighting process between virtual objects can be simulated. In game scenes, in order to save a screen ratio, a control can be associated with multiple functions. When a player clicks on the control, a system determines which function is triggered.

A shooting game scene is taken as an example. In the related technologies, a player clicks on a jump button in an open area to trigger a jumping function, and click on the jump button close a climbable obstacle (such as an enclosure) to trigger a climbing function. However, blindly controlling a virtual object to climb over an obstacle when the virtual object is close to the obstacle may have adverse effects on the player. For example, in a situation where there are enemies on the opposite side of the obstacle, it is actually not suitable to climb over the obstacle. This will go against the player's wishes, and the player needs to climb back again, causing multiple ineffective operations, so that the efficiency of human-computer interaction is reduced, and the initiative and function controlling effectiveness of the player are also reduced. This in turn affects the user experience.

SUMMARY

Embodiments of this application provide a motion processing method and apparatus in a virtual scene, an electronic device, a non-transitory computer-readable storage medium, and a computer program product, which can improve the human-computer interaction efficiency and the initiative and control effectiveness of a player.

Technical solutions in the embodiments of this application are implemented as follows:

The embodiments of this application provide a motion processing method in a virtual scene. The method is performed by an electronic device, and includes:

displaying a virtual scene including a climbable obstacle, a virtual object, and an operation control, the operation control being associated with at least two triggering operations for controlling the virtual object to move over the climbable obstacle in at least two different motion manners;

in response to a triggering operation performed on the operation control, determining a target motion manner corresponding to the triggering operation when a distance between the virtual object and the climbable obstacle is less than a target distance; and controlling the virtual object to move over the climbable obstacle in the target motion manner corresponding to the triggering operation.

The embodiments of this application provide an electronic device, including:

a memory, configured to store executable instructions; and a processor, configured to implement, when executing the executable instructions stored in the memory, the motion processing method in a virtual scene according to the embodiments of this application.

The embodiments of this application provide a non-transitory computer-readable storage medium. The computer-readable storage medium stores executable instructions. When executed by a processor of an electronic device, the executable instructions cause the electronic device to implement the motion processing method in a virtual scene according to the embodiments of this application.

The embodiments of this application have the following beneficial effects:

By application of the embodiments of this application, when a distance between a virtual object and a climbable obstacle is less than a target distance, that is, when the virtual object is close to the climbable obstacle, if a player triggers an operation control simultaneously associated with various motion manners, when the player triggers a triggering operation performed on the operation control, since the triggering operation corresponds to a target motion manner, the virtual object is controlled to move in the target motion manner with respect to the climbable obstacle. In this way, when the virtual object is close to the climbable obstacle, using which motion manner by the virtual object on the climbable obstacle is completely decided by the player according to the triggering operation performed on the operation control, so that the used motion manner complies with the wish of the player, which avoids a situation that deciding a motion manner by a system is against the will of the player and requires frequent operations, and improves the human-computer interaction efficiency and the effectiveness of control of motion manners.

DESCRIPTION OF EMBODIMENTS

Figure 1A:
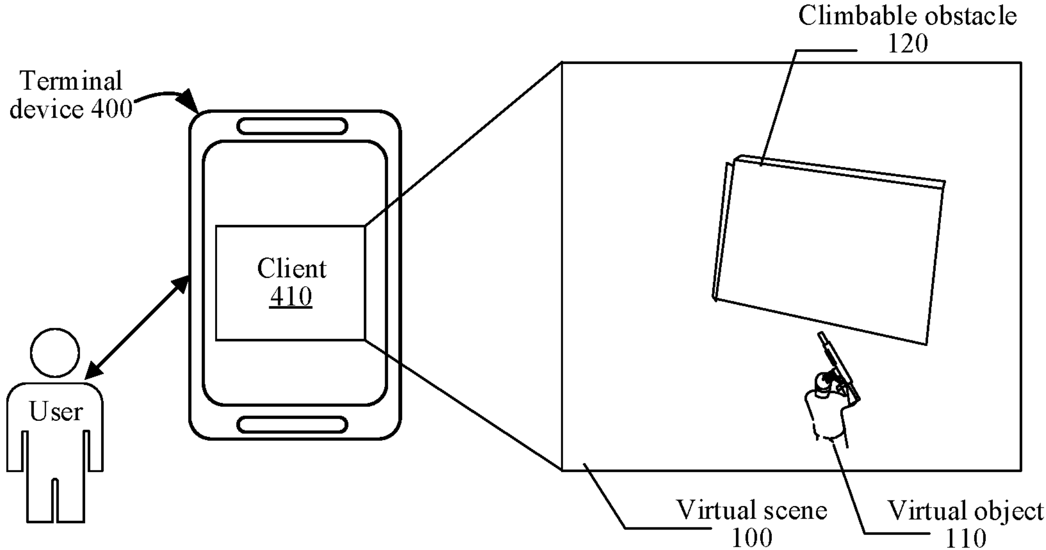
FIG. 1A is a schematic diagram of an application scene of a motion processing method in a virtual scene according to an embodiment of this application.

To make the objectives, technical solutions, and advantages of this application clearer, the following describes this application in further detail with reference to the accompanying drawings. The described embodiments are not to be considered as a limitation on this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following description, the term "first\ second . . . " is merely used to distinguish similar objects and does not represent a specific order of the objects. It may be understood that "first\second . . . " can be interchanged in a specific order or precedence where permitted, to enable the embodiments of this application described herein to be implemented in a sequence other than that illustrated or described here.

Unless otherwise defined, meanings of all technical and scientific terms used in this specification are the same as those usually understood by a person skilled in the art to which this application belongs. Terms used herein are merely intended to describe objectives of the embodiments of this application, but are not intended to limit this application.

Before the embodiments of this application are further described in detail, a description is made on nouns and terms in the embodiments of this application, and the nouns and terms in the embodiments of this application are applicable to the following explanations.

1) Client: It is an application program run in a terminal to provide various services, such as a video playing client and a game client.
2) In response to: It is used to represent a condition or state on which an executed operation depends. When the dependent condition or state is satisfied, one or more of the executed operations can be real-time or have a set delay. Unless otherwise specified, there is no restriction on the order of execution of multiple executed operations.
3) Virtual scene: It is a virtual scene displayed (or provided) when an application program is run on a terminal. The virtual scene can be a simulated environment of a real world, a semi-simulated and semi-fictional virtual environment, or a purely fictional virtual environment. The virtual scene can be any one of a two-dimensional virtual scene, a 2.5-dimensional virtual scene or a three-dimensional virtual scene, and the embodiments of this application do not limit a dimension of a virtual scene. For example, a virtual scene may include a sky, a land, an ocean, and the like. The land includes environmental elements such as a desert and a city. A user can control a virtual object to move in the virtual scene.
4) Virtual object: It represents images of various persons and things for interaction in a virtual scene, or movable objects in the virtual scene. The movable object may a virtual person, a virtual animal, an animation character, and the like. For example: a person, an animal, and the like displayed in a virtual scene. The virtual object may be a virtual image for representing a use in the virtual scene. The virtual scene may include a plurality of virtual objects, and each virtual object has a shape and a volume in the virtual scene, and occupies some space in the virtual scene. Virtual objects can be game characters controlled by users (or players), that is, the virtual objects are controlled by real users and will move in a virtual scene in response to operations performed by the real users on a controller (including a touch screen, a voice-activated switch, a keyboard, a mouse, and a lever). For example, when a real user moves the lever to the left, a virtual object will move to the left in the virtual scene and can still stand still, jump, and use various functions (such as skills and props).
5) Scene data: It represents all feature data in a virtual scene, such as, picture data and audio data of the virtual scene. The picture data can include interactive environment data (for example, a position or environment) of the virtual object in the virtual scene, virtual props held, interaction data with other virtual objects, attribute values of various attributes, and the like, and can also include waiting time required for configuring various functions in the virtual scene.

The embodiments of this application provide a motion processing method and apparatus in a virtual scene, an electronic device, a non-transitory computer-readable storage medium, and a computer program product, which can improve the human-computer interaction efficiency and the control effectiveness. In order to facilitate an easier understanding of the motion processing method in the virtual scene provided by the embodiments of this application, an exemplary implementation scene of the motion processing method in the virtual scene provided by the embodiments of this application is first explained. The virtual scene in the motion processing method in the virtual scene provided by the embodiments of this application can be output separately on the basis of a terminal device or a server, or output collaboratively on the basis of the terminal device and server.

In some embodiments, the virtual scene can also be an environment for interactions of game characters. For example, game characters conduct a virtual battle in the virtual scene. Two parties can interact with each other in the virtual scene by controlling game characters to do actions, so that users can relieve the stress in a game.

In an implementation scene, referring to FIG. 1A, FIG. 1A is a schematic diagram of an application scene of a motion processing method in a virtual scene according to an embodiment of this application. In this application scene, the motion processing method in a virtual scene provided by this embodiment of this application completely depends on the terminal device, and the relevant data calculation of a virtual scene 100 can be completed by using computing power of graphics processing hardware of the terminal device 400. For example, for a game of a stand-alone version/an offline game, a virtual scene is output through various different types of terminal devices 400 such as a smartphone, a tablet, and a virtual reality/augmented reality device. As an example, the graphics processing hardware may include a Central Processing Unit (CPU) and a Graphics Processing Unit (GPU).

To form a visual perception of the virtual scene 100 is formed, the terminal device 400 calculates data required for displaying through graphics computing hardware, and completes loading, parsing, and rendering of display data. Graphics output hardware outputs video frames that can form the visual perception of the virtual scene, for example, two-dimensional video frames are displayed on a display screen of a smartphone, or, video frames that achieve a three-dimensional display effect are projected to lenses of augmented reality/virtual reality glasses. In addition, in order to enrich a perception effect, the terminal device 400 can also form one or more of an auditory perception, a tactile perception, a motion perception, and a taste perception by virtue of different hardware.

As an example, a client 410 (for example, a game application of a stand-alone version) is run on the terminal device 400. During the running of the client 410, the virtual scene 100 including role playing is output. The virtual scene 100 may be an environment for interaction of game characters, such as, a plain, a street, and a valley where the game characters fight against each other. The virtual scene 100 includes a held virtual object 110 and a climbable obstacle 120 such as a wall and an oil drum. The virtual object 110 can move in various motion manners with respect to the climbable obstacle 120. For example, the virtual object 110 can move in a motion manner of climbing with respect to the climbable obstacle 120, to climb from one side of the climbable obstacle to the other side. The virtual object 110 can also move in a motion manner of jumping with respect to the climbable obstacle 120, to jump from one side of the climbable obstacle and stand on the climbable obstacle.

As an example, the terminal device displays a climbable obstacle, a virtual object, and an operation control of a virtual scene, the operation control being used for controlling a motion manner of the virtual object to move over the climbable obstacle, the operation control being associated with at least two motion manners, and different triggering operations performed on the operation control corresponding to different motion manners; and when a distance between the virtual object and the climbable obstacle is less than a target distance, controls, in response to a triggering operation performed on the operation control, the virtual object to move over the climbable obstacle in a target motion manner corresponding to the triggering operation. In this way, using which motion manner by the virtual object on the climbable obstacle is completely decided by a player according to the triggering operation performed on the operation control, so that the initiative of the player is improved, and the used motion manner complies with the wish of the player, which avoids a situation that deciding a motion manner by a system is against the will of the player and requires frequent operations, and improves the human-computer interaction efficiency and the effectiveness of control of motion manners.

Figure 1B:
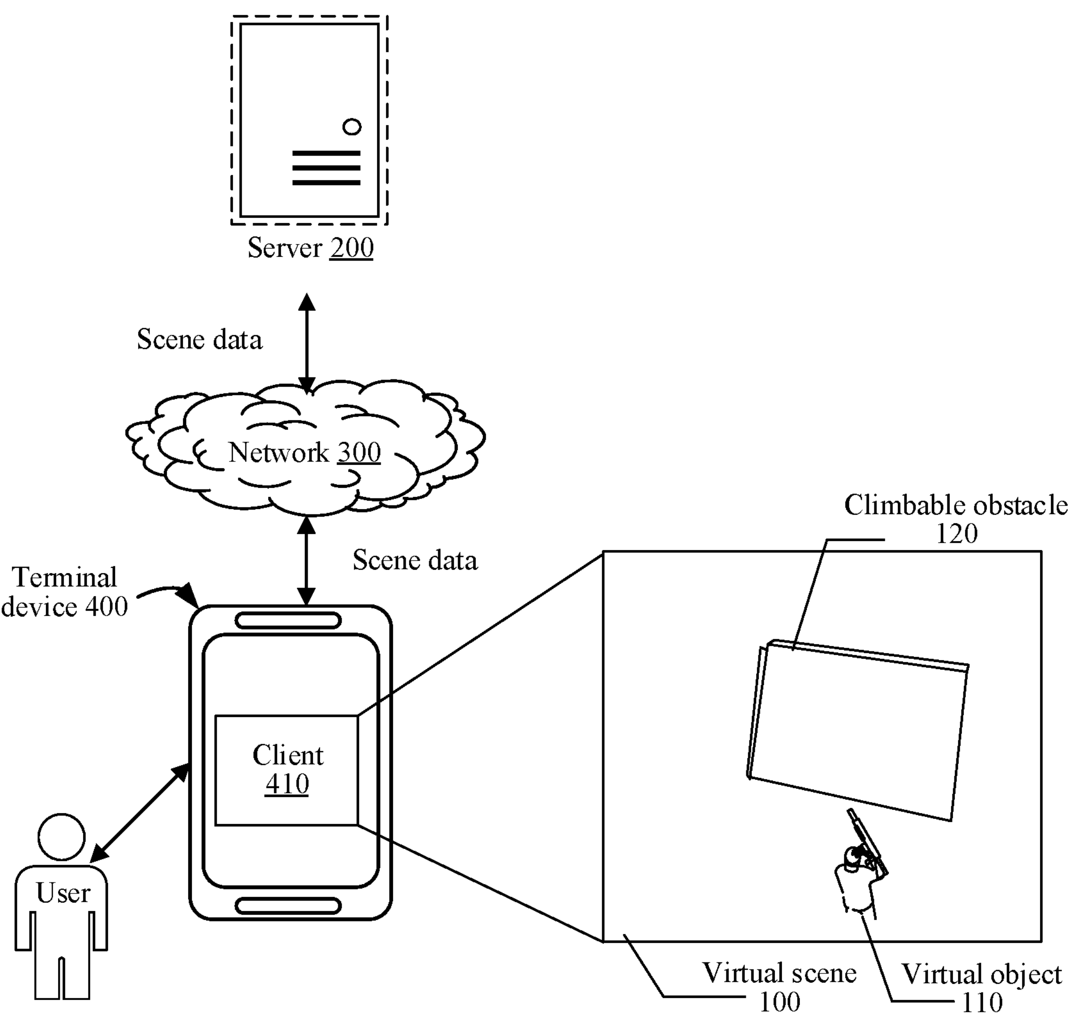
FIG. 1B is a schematic diagram of an application scene of a motion processing method in a virtual scene according to an embodiment of this application.

In another implementation scene, referring to FIG. 1B, FIG. 1B is a schematic diagram of an application scene of a motion processing method in a virtual scene according to an embodiment of this application, applied to a terminal device 400 and a server 200. In this application scene, virtual scene calculation is completed by using computing power of the server 200, and a virtual scene is output by the terminal device 400. By way of example, a visual perception of the virtual scene 100 is formed. The server 200 calculates display data (such as scene data) related to a virtual scene and transmits the display data to the terminal device 400 through a network 300. The terminal device 400 loads, parses, and renders the calculated display data by using graphics computing hardware, and outputs the virtual scene by using graphics output hardware, so as to form the visual perception, for example, two-dimensional video frames can be displayed on a display screen of a smartphone, or video frames that achieve a three-dimensional display effect are projected to lenses of augmented reality/virtual reality glasses. It can be understood that the formed perception of the virtual scene can be output by using the corresponding hardware of the terminal device 400, such as forming an auditory perception by using a microphone and forming a tactile perception by using a vibrator.

As an example, a client 410 (for example, a game application of a stand-alone version) is run on the terminal device 400. During the running of the client 410, the virtual scene 100 including role playing is output. The virtual scene 100 may be an environment for interaction of game characters, such as, a plain, a street, and a valley where the game characters fight against each other. The virtual scene 100 includes a held virtual object 110 and a climbable obstacle 120 such as a wall and an oil drum. The virtual object 110 can move in various motion manners with respect to the climbable obstacle 120. For example, the virtual object 110 can move in a motion manner of climbing with respect to the climbable obstacle 120, to climb from one side of the climbable obstacle to the other side. The virtual object 110 can also move in a motion manner of jumping with respect to the climbable obstacle 120, to jump from one side of the climbable obstacle and stand on the climbable obstacle.

In some embodiments, the terminal device 400 may implement a motion processing method in a virtual scene provided in this embodiment of this application by running a computer program. For example, the computer program may be a native program or software module in an operating system. The computer program may be a native application (APP), and a program that can only be run in the operating system, for example, a shooting game APP (that is, the above-mentioned client 410). The computer program may also be a mini program, which can be run after being simply downloaded to a browser environment. The computer program may also be a game mini program that can be embedded into any APP. In summary, the above computer program can be any form of application program, module, or plug-in.

By way of example, the computer program is an APP. In actual implementation, the terminal device 400 installs and runs an APP that supports a virtual scene. This APP may be any one of first-person shooting game (FPS), a third-person shooting game, a virtual reality APP, a three-dimensional map program, a simulation program, or multi-person gunfight survival game. A user uses the terminal device 400 to operate a virtual object located in virtual scenes to do activities. The activities include but are not limited to: at least one of adjusting the posture of the body, crawling, walking, running, riding, jumping, driving, picking up, shooting, attacking, throwing, and constructing a virtual building. Schematically, the virtual object may be a virtual person, such as a simulated person character or cartoon character.

In some other embodiments, this embodiment of this application can also be achieved by a cloud technology. T cloud technology is a hosting technology for unifying a series of resources such as hardware, software, and networks in a wide area network or a local area network to achieve computation, storage, processing and sharing of data.

The cloud technology is a general name of a network technology, an information technology, an integration technology, a management platform technology, an application technology and the like and applied on the basis of a cloud computing business mode, can form a resource pool for on-demand use, and is flexible and convenient. A cloud computing technology will become an important support. Background services of a technical network system require a large amount of computing and storage resources.

As an example, the server 200 in FIG. 1B may be an independent physical server, or may be a server cluster or a distributed system formed by a plurality of physical servers, or may be a cloud server that provides basic cloud computing services such as cloud services, cloud databases, cloud computing, cloud functions, cloud storage, network services, cloud communication, middleware services, domain name services, security services, Content Delivery Networks (CDNs), big data, and artificial intelligence platforms. The terminal device 400 may be a smartphone, a tablet computer, a notebook computer, a desktop computer, a smart speaker, a smartwatch, or the like, but is not limited thereto. The terminal device 400 and the server 200 may be directly or indirectly connected in a wired or wireless communication manner. This embodiment of this application does not limit this.

Figure 2:
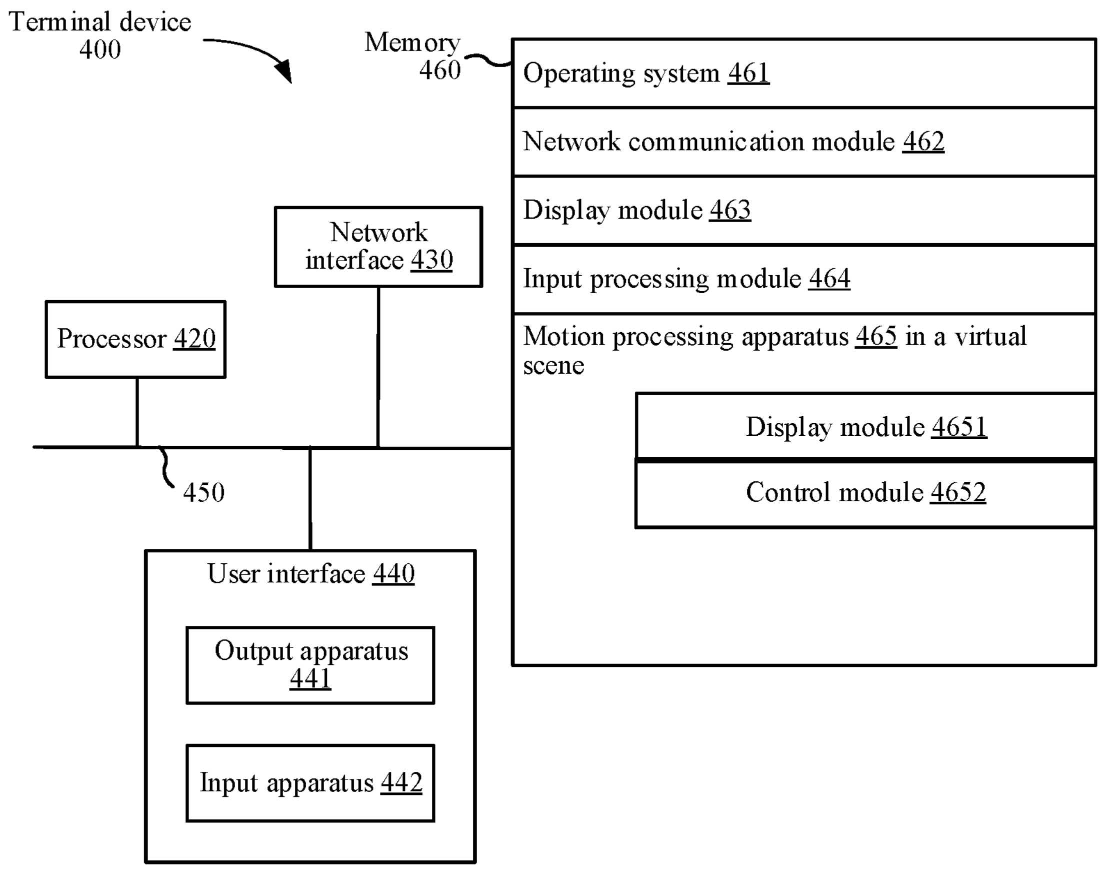
FIG. 2 is a schematic structural diagram of a terminal device 400 according to an embodiment of this application.

An electronic device for implementing the above method provided by this embodiment of this application is described below. The electronic device may be the terminal device 400 shown in FIG. 1A, or the terminal device and the server shown in FIG. 1B. By way of example, the electronic device is the terminal device 400. Referring to FIG. 2, FIG. 2 is a schematic structural diagram of a terminal device 400 according to an embodiment of this application. The terminal device 400 shown in FIG. 2 includes: at least one processor 420, a memory 460, at least one network interface 430, and a user interface 440. The various components in the terminal device 400 are coupled together by using a bus system 450. It can be understood that the bus system 450 is configured to implement connection and communication between these components. In addition to a data bus, the bus system 450 further includes a power bus, a control bus, and a state signal bus. But, for ease of clear description, all types of buses in FIG. 2 are marked as the bus system 450.

The processor 420 may be an integrated circuit chip having a signal processing capability, such as a general purpose processor, a Digital Signal Processor (DSP), or other programmable logic devices, a discrete gate or transistor logic device, and a discrete hardware assembly. The general purpose processor may be a microprocessor or any conventional processor, and the like.

The user interface 440 includes one or more output apparatuses 441 capable of displaying a media content, including one or more speakers and/or one or more visual display screens. The user interface 440 further includes one or more input apparatuses 442, including a user interface component helpful to typing, such as a keyboard, a mouse, a microphone, a touch display screen, a camera, other input buttons, and a control.

The memory 460 may be removable, unremovable, or another combination. An exemplary hardware device includes a solid-state memory, a hard disk drive, an optical disk drive, and the like. The memory 460 alternatively includes one or more storage devices away from the processor 420 in physical positions.

The memory 460 may be a volatile memory or a non-volatile memory, or may include both a volatile memory and a non-volatile memory. For example, the non-volatile memory may be a read only memory (ROM), and the volatile memory may be a random access memory (RAM). The memory 460 described in this embodiment of this application aims to include any other suitable type of memories.

In some embodiments, the memory 460 can store data to support various operations. Examples of the data include a program, a module, and a data structure or other subsets or supersets, which are exemplified below.

An operating system 461 includes a system program configured to process various basic system services and performing hardware-related tasks, for example, a framework layer, a core library layer, a drive layer, and the like, to implement various basic services and process hardware-based tasks.

A network communication module 462 is configured to reach other computing devices via one or more (wired or wireless) network interfaces 430. Exemplarily, the network interfaces 430 include: Bluetooth, WiFi, Universal Serial Bus (USB), and the like.

A display module 463 is configured to display information via the one or more output apparatuses 441 (for example, a display screen and speaker) associated with the user interface 440 (for example, a user interface used for operating peripheral devices and displaying contents and information).

An input processing module 464 is configured to detect one or more user inputs or interactions from the one or more input apparatuses 442 and translate the detected inputs or interactions.

In some embodiments, a motion processing apparatus in a virtual scene provided by this embodiment of this application may be implemented in software. FIG. 2 shows a navigation processing apparatus 465 in a virtual scene stored in the memory 460, which can be software in the form of a program and a plug-in, including the following software modules: a display module 4651 and a control module 4652. These modules are logic, so that any combination or division can be performed according to the functions realized, and the functions of the various modules will be described below.

In some other embodiments, a motion processing apparatus in a virtual scene provided by this embodiment of this application may be implemented in hardware. As an example, the motion processing apparatus in a virtual scene provided by this embodiment of this application may be a processor in the form of a hardware decoding processor, and is programmed to implement the motion processing apparatus in a virtual scene provided by this embodiment of this application. For example, the processor in the form of a hardware decoding processor may use one or more application-specific integrated circuits (ASICs), a DSP, a programmable logic device (PLD), a complex programmable logic device (CPLD), a field-programmable gate array (FPGA), or other electronic elements.

A motion processing method in a virtual scene according to an embodiment of this application will be described below in combination with the accompanying drawings. The motion processing method in a virtual scene according to this embodiment of this application may be performed by a terminal device or a server alone, or may be performed synergistically by the terminal device 400 and the server 200.

Figure 3:
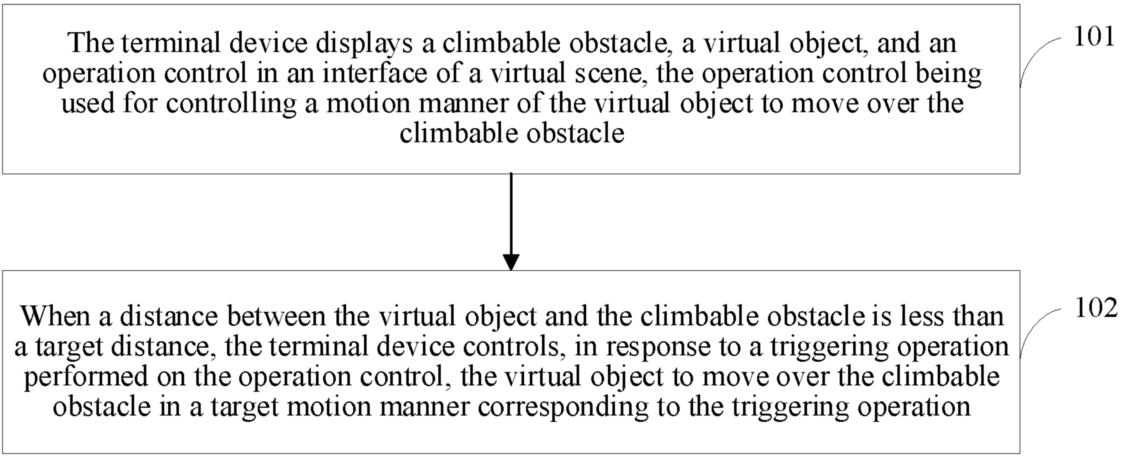
FIG. 3 is a flowchart of a motion processing method in a virtual scene according to an embodiment of this application.

By way of example, the motion processing method in a virtual scene according to this embodiment of this application is performed by the terminal device 400 in FIG. 1A alone, and a description is made below. Referring to FIG. 3, FIG. 3 is a flowchart of a motion processing method in a virtual scene according to an embodiment of this application, which is explained in combination with steps shown in FIG. 3.

The method shown in FIG. 3 may be performed by computer programs in various forms, which are run on the terminal device 400 and are not limited to the above-mentioned client 410. Or, the computer program may be the above-mentioned operating system 461, software module, and script. Therefore, the client is not considered as limiting the embodiments of this application.

Step 101: The terminal device displays a climbable obstacle, a virtual object, and an operation control in an interface of a virtual scene, the operation control being used for controlling a motion manner of the virtual object to move over the climbable obstacle.

In practical applications, a client that supports a virtual scene is installed on the terminal device (for example, when the virtual scene is a game, the corresponding client may be a shooting game APP). When a user opens the client installed on the terminal device (for example, when the user clicks on an icon corresponding to the shooting game APP displayed on a user interface of the terminal device), and the client is run on the terminal device, an interface of the virtual scene can be displayed in the client, and a virtual object corresponding to a current login account in the virtual scene, an environment (such as a flat ground, a climbable obstacle (such as a wall and an oil drum)) in which the virtual object is located in the virtual scene, and an operation control used for controlling a motion manner of the virtual object with respect to the climbable obstacle are displayed in the interface of the virtual scene. There are at least two different motion manners associated with the operation control. Different triggering operations performed on the operation control correspond to different motion manners. Players can control virtual objects to move in corresponding motion manners with respect to an obstacle object by performing corresponding triggering operations of the corresponding motion manners on the operation control.

Step 102: When a distance between the virtual object and the climbable obstacle is less than a target distance, the terminal device controls, in response to a triggering operation performed on the operation control, the virtual object to move over the climbable obstacle in a target motion manner corresponding to the triggering operation.

The target distance is a distance that can be preset according to an actual situation, and is related to various motion manners associated with the operation control. For example, the motion manners associated with the operation control include climbing and jumping. The target distance is a distance that the virtual object can climb from one side of the climbable obstacle to the other side when the virtual object is close to the climbable obstacle, or a distance that the virtual object can jump from one side of the climbable obstacle and stand on the climbable obstacle.

In practical applications, in order to adapt to operation requirements of different users, operation modes of the various motion manners associated with the operation control can be adjusted and set. The operation modes include a combined mode and a split mode. In some embodiments, before controlling the virtual object to move in the target motion manner corresponding to the triggering operation, the terminal device may adjust, in response to a setting instruction for an operation mode of the operation control, the operation mode of the at least two motion manners associated with the operation control to the split mode. Correspondingly, in the split mode, when a distance between the virtual object and the climbable obstacle is less than a target distance, the terminal device controls, in response to a triggering operation performed on the operation control, the virtual object to move over the climbable obstacle in a target motion manner corresponding to the triggering operation, so that a motion manner of the virtual object with respect to the climbable obstacle is decided by the user. If the user sets the operation mode of the operation control to the combined mode, a motion manner of the virtual object with respect to the climbable obstacle is decided by a system according to a position of the virtual object. In this way, the user can select, according to his own wish and need, whether to enable the split mode of the operation control.

Next, by way of example for explanation, the motion manners associated with the operation control include climbing and jumping.

Figure 4:
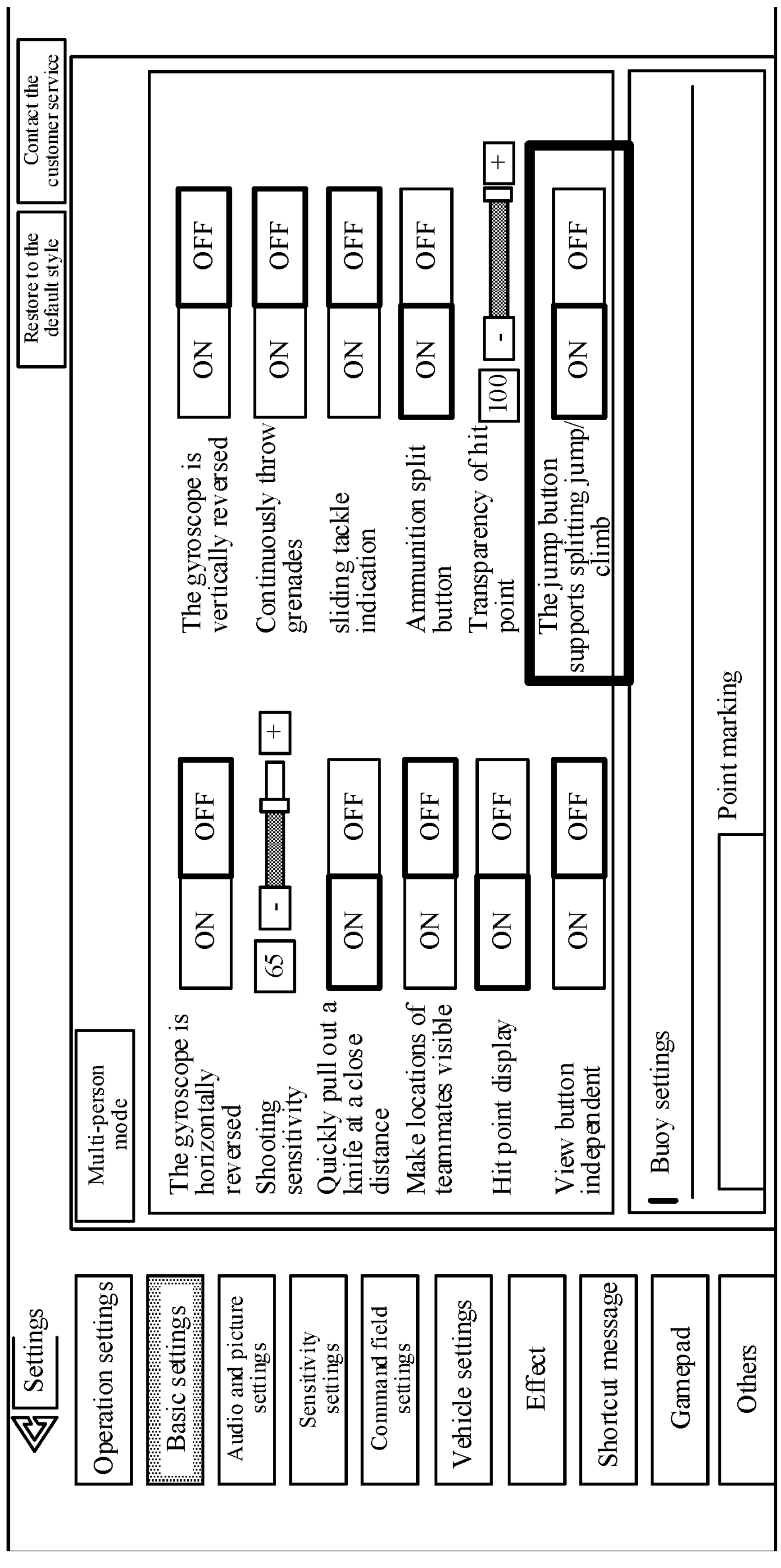
FIG. 4 is a schematic diagram of a setting interface of an operation control according to an embodiment of this application.

Referring to FIG. 4, FIG. 4 is a schematic diagram of a setting interface of an operation control according to an embodiment of this application. ON/OFF options used for setting the operation modes of the two motion manners associated with the operation control are displayed in the setting interface. When OFF is selected, the operation mode is adjusted to the combined mode, and when ON is selected, the operation mode is adjusted to the split mode. When the operation mode is adjusted to the combined mode, controlling is performed in a conventional way. That is, the motion manner of the virtual object with respect to the climbable obstacle, which is triggered by the user triggering the operation control, is determined by the system according to a position environment of the virtual object. For example, when the distance between the virtual object and the climbable object is less than the target distance, if the terminal device receives the triggering operation performed on the operation control, the terminal device controls the virtual object to move in the motion manner of climbing with respect to the climbable obstacle, that is, controls the virtual object to climb from one side of the climbable obstacle to the other side. For another example, when the virtual object moves on a flat ground or the distance between the virtual object and the climbable obstacle exceeds the target distance (the virtual object cannot climb over the climbable obstacle), if the terminal device receives the triggering operation performed on the operation control, the terminal device controls the virtual object to move in the motion manner of jumping.

When the operation mode is adjusted to the split mode, controlling is performed according to the motion processing method of this embodiment of this application, that is, the motion manner of the virtual object with respect to the climbable obstacle is determined by the triggering operation performed by the user on the operation control. If the triggering operation corresponds to which motion manner, the virtual object is controlled to move with respect to the climbable obstacle in this corresponding motion manner. If the triggering operation corresponds to the motion manner of jumping, the virtual object is controlled to jump from one side of the climbable obstacle and stand on the climbable obstacle. If the triggering operation corresponds to the motion manner of climbing, the virtual object is controlled to climb from one side of the climbable obstacle to the other side.

Through the above manner, the user is provided with a setting entry (namely, the ON/OFF options) for setting the operation modes. The user can set a suitable operation mode according to his own operation habit, thereby improving applicability and facilitating improving the effectiveness of controlling a motion direction.

In some embodiments, the terminal device may receive the triggering operation performed on the operation control in the following way: controlling, in response to a pressing operation performed on the operation control, a display style of the operation control to be switched from a default style to a first style, the first style corresponding to the target motion manner; and receiving the triggering operation in response to a release operation triggered by the operation control in the first style and performed on the pressing operation, the triggering operation including the pressing operation and the release operation, that is, receiving the triggering operation when the pressing operation performed on the operation control in the first style is released.

Figure 5:
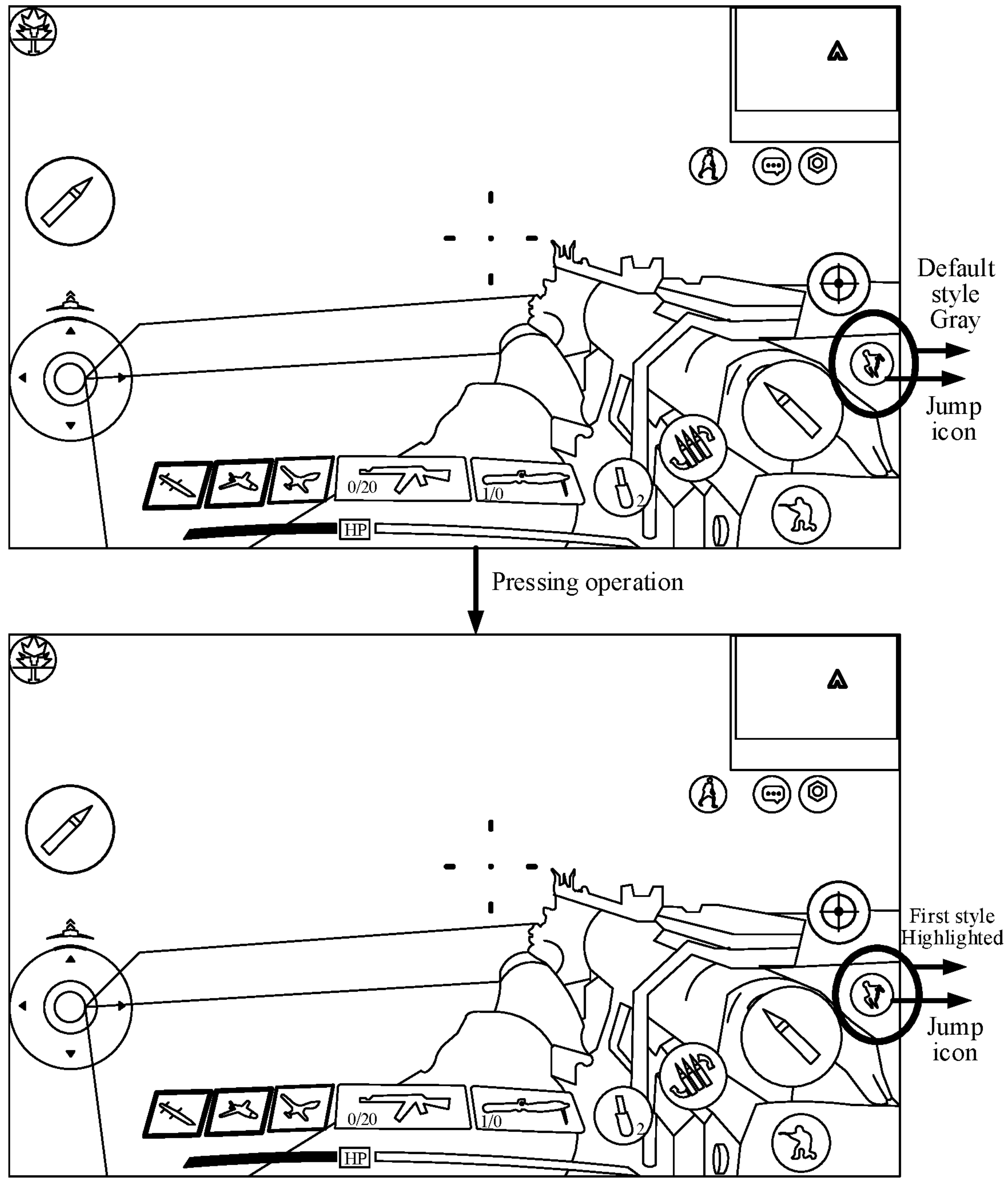
FIG. 5 is a schematic diagram of displaying of an operation control according to an embodiment of this application.

Referring to FIG. 5, FIG. 5 is a schematic diagram of displaying of an operation control according to an embodiment of this application. Corresponding icons, for example, an icon (such as a jump icon) corresponding to the target motion manner, are displayed in a display region of the operation control. Before the terminal device receives the pressing operation performed on the operation control, the operation control is displayed in a default style (such as, a gray style, indicating that the operation control is not pressed). When the terminal device receives the pressing operation performed on the operation control, the display style of the operation control is controlled to be switched from the default style to the first style (such as a highlighted style, indicating that the operation control is pressed) for displaying. The user can continue to press the operation control in the first style. In the continuous pressing process, when the pressing operation is released, the terminal device determines the continuous operations including the pressing operation and the release operation as the triggering operation performed on the operation control. After receiving the triggering operation, the terminal device determines whether the triggering operation corresponds to the target motion manner associated with the operation control, and executes subsequent operations on the basis of a determination result. That is, when receiving the pressing operation performed on the operation control, the terminal device does not execute the subsequent determining function. Instead, when receiving the release operation, the terminal device determines which motion manner is associated with the operation control according to the triggering operation including the pressing operation and the release operation, that is, controls the virtual object to move with respect to the climbable obstacle in which motion manner. For example, the virtual object is controlled to move in a corresponding motion manner with respect to the climbable obstacle.

In some embodiments, before controlling the virtual object to move in the target motion manner with respect to the climbable obstacle, the terminal device may determine whether the received triggering operation corresponds to the target motion manner in the following way: obtaining a distance between a position corresponding to the pressing operation and a position corresponding to the release operation; and determining, when the distance is less than a first distance threshold, that the triggering operation corresponds to the target motion manner.

After receiving the triggering operation performed on the operation control, the terminal device may compare the received triggering operation with the triggering operations corresponding to the various motion manners associated with the operation control, and screen out, according to a comparison result, the motion manner corresponding to the received triggering operation from the various motion manners associated. For example, assuming that the triggering operation corresponding to the target motion manner include the pressing and release operations performed on the operation control, and the distance between the position corresponding to the pressing operation and the position corresponding to the release operation is less than the first distance threshold, the terminal device will compare the received triggering operation with the triggering operations corresponding to the various motion manners after receiving the triggering operation (including the pressing operation and the release operation) performed on the operation control, so as to determine the target motion manner corresponding to the received triggering operation, and will control the virtual object to move in the target motion manner with respect to the climbable obstacle.

In some embodiments, the triggering operation performed on the operation control also includes a first sliding operation. In the process of performing the pressing operation on the operation control in the first style, the terminal device may further receive the first sliding operation triggered by the operation control in the first style. In a sliding process, that is, during sliding the operation control on the basis of the first sliding operation, a release operation following the pressing operation and a release operation following the first sliding operation are received. That is, when the pressing operation and the first sliding operation are released, the triggering operation is received.

In the process of performing the pressing operation on the operation control in the first style, the user can slide the operation control while pressing the operation control, and release the pressing operation and the sliding operation at a certain distance. In this case, the pressing operation, the first sliding operation, and the release operation are continuous operations, and the continuous operations are determined as the triggering operation performed on the operation control. In this case, whether the triggering operation is the same as the triggering operation corresponding to the target motion manner can be determined according to a sliding distance or a sliding trajectory of the sliding operation. When it is determined that the two triggering operations are the same, the virtual object is controlled to move in the target motion manner with respect to the climbable obstacle.

In some embodiments, the triggering operation performed on the operation control further includes a second sliding operation. In the process of performing the pressing operation on the operation control in the first style, the terminal device may further receive the second sliding operation performed on the operation control in the first style. In a sliding process, that is, during sliding the operation control on the basis of the second sliding operation, the terminal device controls, in response to a sliding distance of the second sliding operation being not less than a first distance threshold, the display style of the operation control to be switched from the first style to a second style, the second style corresponding to another motion manner among the at least two motion manners associated with the operation control except the target motion manner. The terminal device receives, during displaying the operation control in the second style, a release operation following the pressing operation performed on the operation control in the second style and a release operation following the second sliding operation.

The first distance threshold is a distance used for distinguishing the target motion manner from another motion manner. If the terminal device receives the release operation when the sliding distance of the second sliding operation is less than the first distance threshold, the triggering operation (including the pressing operation, the second sliding operation, and the release operation) performed on the operation control corresponds to the target motion manner. In this case, the terminal device may control the virtual object to move in the target motion manner with respect to the climbable obstacle. If the terminal device receives the release operation when the sliding distance of the second sliding operation is not less than (greater than or equal to) the first distance threshold, the triggering operation (including the pressing operation, the second sliding operation, and the release operation) performed on the operation control corresponds to another motion manner different from the target motion manner. In this case, the terminal device may control the virtual object to move in the another motion manner with respect to the climbable obstacle.

Figure 6:
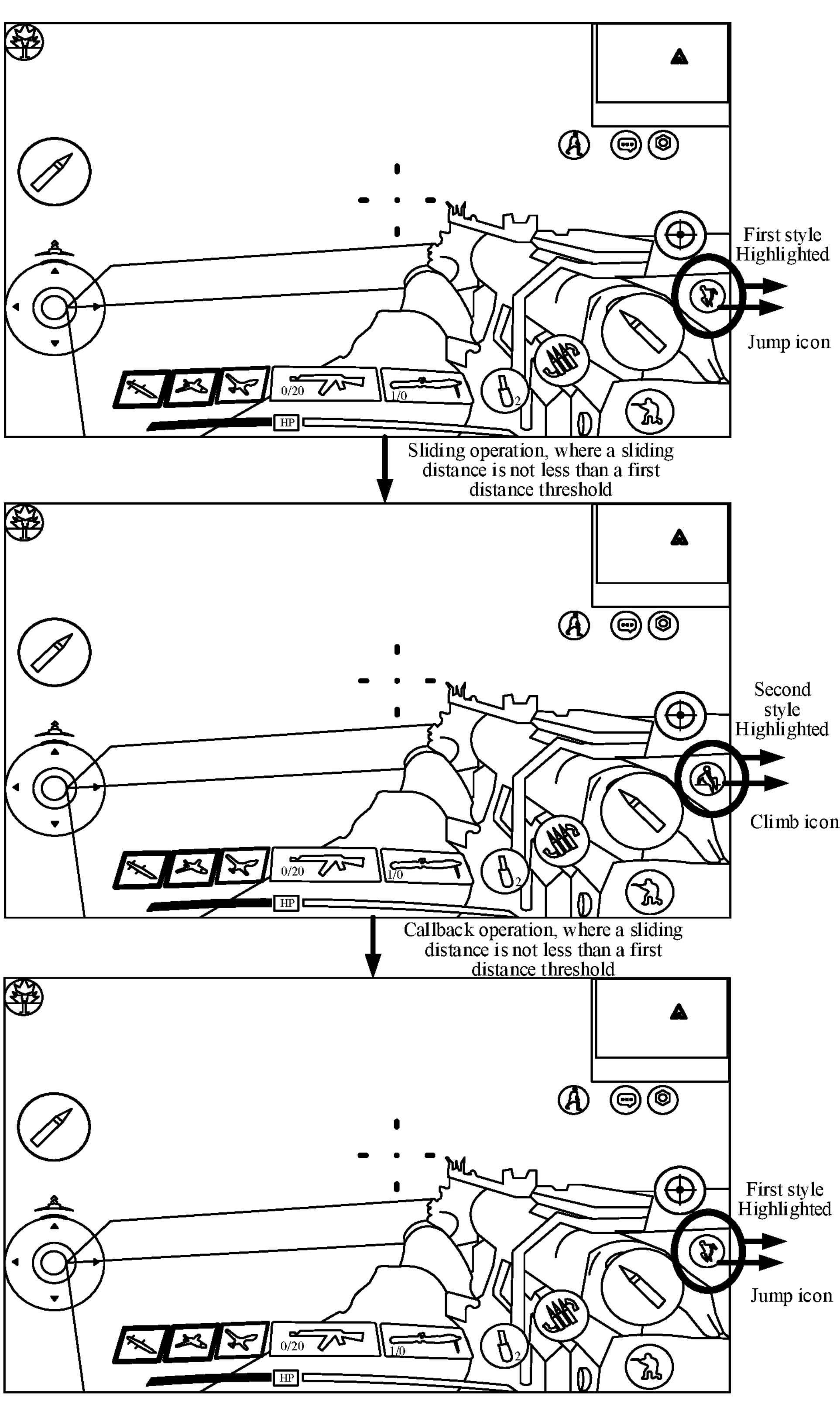
FIG. 6 is a schematic diagram of displaying of an operation control according to an embodiment of this application.

Refer to FIG. 6, FIG. 6 is a schematic diagram of displaying of an operation control according to an embodiment of this application. In the process that the user continuously performs the pressing operation and the second sliding operation on the operation control in the first style, if the sliding distance of the second sliding operation is less than the first distance threshold, the display style of the operation control remains unchanged in the first style. If the sliding distance of the second sliding operation is greater than or equal to the first distance threshold, the triggering operation performed on the operation control will not correspond to the target motion manner. In this case, the terminal device controls the display style of the operation control to be switched from the first style to the second style corresponding to the another motion manner. For example, if the target motion manner is jumping, and the another motion manner is climbing, the terminal device controls the icon displayed in the display region of the operation control to be switched from a jump icon to a climb icon to remind the user that a climbing function can be triggered in this situation. Namely, the terminal device may control the virtual object to move in the motion manner of climbing with respect to the climbable obstacle.

In some embodiments, the triggering operation performed on the operation control further includes a callback operation. The terminal device may receive a release operation following the pressing operation and a release operation following the second sliding operation in the following way: receiving, during performing the pressing operation and the second sliding operation on the operation control in the second style, the callback operation performed on the second sliding operation; in a callback process, that is, during calling back the operation control on the basis of the callback operation, controlling, in response to a callback distance of the callback operation exceeding a second distance threshold, the display style of the operation control to be restored from the second style to the first style; and receiving, during displaying the operation control in the first style, a release operation following the pressing operation, a release operation following the second sliding operation, and a release operation performed on the callback operation.

Continuing to refer to FIG. 6, in the process of performing the pressing operation and the second sliding operation on the operation control in the second style, in such a case that the triggering operation performed on the operation control will not correspond to the target motion manner if the sliding distance of the second sliding operation is greater than or equal to the first distance threshold, the sliding distance of the second sliding operation (the sliding distance of the second sliding operation before the callback minus a callback distance of the callback operation) can be less than the first distance threshold by performing the callback operation (coherent to the second sliding operation, for example, continuing to slide in an opposite direction to the second sliding operation), thereby causing the triggering operation performed on the operation control to correspond to the target motion manner. In this case, the icon displayed in the display region of the operation control is restored from the climb icon to the jump icon. When the release operation is received in the process of displaying the operation control by the jump icon, the triggering operation (including the pressing operation, the second sliding operation, the callback operation, and the release operation) performed on the operation control corresponds to the target motion manner. In this case, the terminal device may control the virtual object to move in the target motion manner with respect to the climbable obstacle.

In some embodiments, the terminal device may receive a release operation following the pressing operation and a release operation following the second sliding operation in the following way: during performing the pressing operation and the second sliding operation on the operation control in the second style, controlling, in response to a moving instruction performed on the virtual object, the virtual object to move in the virtual scene along a direction indicated by the moving instruction; controlling, in the moving process in response to the distance between the virtual object and the climbable obstacle being not less than the target distance, the display style of the operation control to be restored from the second style to the first style; and receiving, during displaying the operation control in the first style, a release operation following the pressing operation and a release operation following the second sliding operation.

In the process of performing the pressing operation and the second sliding operation on the operation control in the second style, in such a case that the triggering operation performed on the operation control will not correspond to the target motion manner if the sliding distance of the second sliding operation is greater than or equal to the first distance threshold, the triggering operation performed on the operation control may be made to correspond to the target motion manner by controlling the virtual object to get away from the climbable obstacle. By way of example, the target motion manner is jumping, and the another motion manner is climbing. In this case, the icon displayed in the display region of the operation control is restored from the climb icon to the jump icon. When the release operation performed on the triggering operation is received in the process of displaying the operation control by the jump icon, the triggering operation (including the pressing operation, the second sliding operation, and the release operation) performed on the operation control corresponds to the target motion manner. In this case, the terminal device may control the virtual object to move in the target motion manner with respect to the climbable obstacle. That is, the terminal device controls the virtual object to jump with respect to the climbable obstacle, so that the virtual object jumps from one side of the climbable obstacle to the other side of the climbable obstacle.

In some embodiments, before controlling the virtual object to move in the target motion manner with respect to the climbable obstacle, the terminal device may also determine whether the received triggering operation corresponds to the target motion manner in the following way: obtaining pressing parameters of the pressing operation when the triggering operation comprises a pressing operation performed on the operation control, the pressing parameters comprising at least one of the following: a pressing duration, pressing strength, and a pressing frequency; and determining, when the pressing parameters match a target pressing parameter of the target motion manner, that the triggering operation corresponds to the target motion manner.

When the various motion manners associated with the operation control are triggered by the pressing operation performed on the operation control, different pressing parameters may correspond to different motion manners. By way of example, the pressing parameter is the pressing duration. Among a first motion manner, a second motion manner, and a third motion manner associated with the operation control, a first pressing duration corresponding to the first motion manner is less than or equal to a first duration threshold; a second pressing duration corresponding to the second motion manner is greater than the first duration threshold, and the second pressing duration is less than or equal to a second duration threshold; the second duration threshold is greater than the first duration threshold; and a third pressing duration corresponding to the third motion manner is greater than the second duration threshold. For example, if the pressing duration corresponding to the first motion manner is less than one second, the pressing duration corresponding to the second motion manner is greater than one second and less than three seconds, and the pressing duration corresponding to the third motion manner is greater than three seconds, after the terminal device receives the triggering operation (including the pressing operation) performed on the operation control, the terminal device matches a pressing duration of the pressing operation in the received triggering operation (a difference between time of the release operation following the pressing operation and time of the pressing operation) with the pressing durations corresponding to the three motion manners associated with the operation control separately, and screens out a motion manner that matches the pressing duration as a to-be-used motion manner. For example, if the pressing duration of the received pressing operation is 2 seconds, the corresponding to-be-used motion manner is the second motion manner. Or, the terminal device directly compares a pressing duration of the pressing operation in the received triggering operation with the pressing duration corresponding to the target motion manner. If the two pressing durations are consistent, the terminal device determines that the received triggering operation corresponds to the target motion manner, that is, the to-be-used motion manner indicated by the triggering operation is the target motion manner.

In some embodiments, before controlling the virtual object to move in the target motion manner with respect to the climbable obstacle, the terminal device may also determine whether the received triggering operation corresponds to the target motion manner in the following way: obtaining a sliding trajectory corresponding to the sliding operation when the triggering operation comprises a sliding operation performed on the operation control; and determining, when the sliding trajectory matches a target sliding trajectory corresponding to the target motion manner, that the triggering operation corresponds to the target motion manner.

When the triggering operation performed on the operation control includes the sliding operation performed on the operation control, whether the received triggering operation corresponds to the target motion manner can also be determined by using the sliding trajectory in addition to using the sliding distance. In some embodiments, each motion manner corresponds to one sliding trajectory, and different motion manners correspond to different sliding trajectories. For example, among the first motion manner, second motion manner, and third motion manner associated with the operation control, the sliding trajectory corresponding to the first motion manner is "V"-shaped; the sliding trajectory corresponding to the second motion manner is "S"-shaped; and other sliding trajectories other than the above two sliding trajectories correspond to the third motion manner. After the terminal device obtains the triggering operation (including the sliding operation) performed on the operation control, the terminal device matches a sliding trajectory of the received triggering operation with the sliding trajectories corresponding to the three motion manners associated with the operation control, and screens out the motion manner corresponding to the matching sliding trajectory as the to-be-used motion manner. For example, if the sliding trajectory of the received sliding operation is "V"-shaped, the corresponding to-be-used motion manner is the first motion manner. Or, the terminal device directly compares a sliding trajectory of the sliding operation in the received triggering operation with the sliding trajectory corresponding to the target motion manner. If the two sliding trajectories are consistent, the terminal device determines that the received triggering operation corresponds to the target motion manner, that is, the to-be-used motion manner indicated by the triggering operation is the target motion manner.

In some embodiments, the terminal device may further receive the triggering operation performed on the operation control in the following way: displaying, in response to a pressing operation performed on the operation control, options corresponding to various motion manners of the at least two motion manners associated with the operation control; and receiving, in response to a selection operation performed on a target option, the triggering operation performed on the operation control, and determining a motion manner corresponding to the target option as a motion manner, namely, the above-mentioned target motion manner, indicated by the triggering operation.

In practical applications, the options corresponding to the various motion manners can be displayed in various ways of, for example, a floating window, a list, and a control. This embodiment of this application does not limit this.

Figure 7:
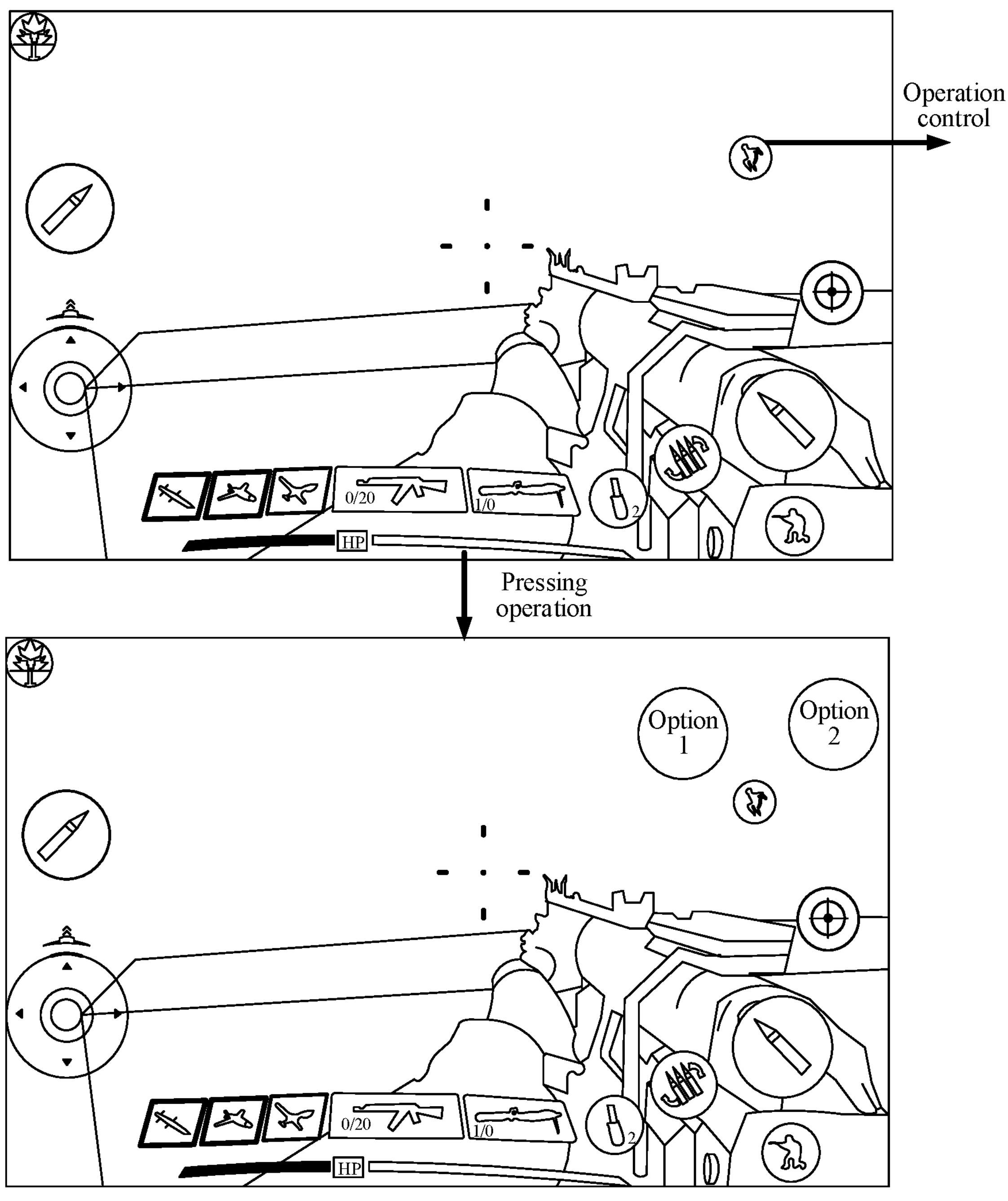
FIG. 7 is a schematic diagram of triggering of an operation control according to an embodiment of this application.

Referring to FIG. 7, FIG. 7 is a schematic diagram of triggering of an operation control according to an embodiment of this application. When the user presses (or clicks on) the operation control, the option corresponding to each of the various motion manners associated with the operation control is displayed in a region associated with the operation control. For example, a plurality of selectable options are displayed in the form of a floating window. In the process of pressing the operation control, the user swipes the operation control with a finger to a region where a target option is located, or directly clicks on the target option, to trigger a selection operation performed on the target option as the triggering operation performed on the operation control, and determines the motion manner corresponding to the target option instructed to be selected by the selection operation as the motion manner instructed to be executed by the triggering operation. If the motion manner corresponding to the target option is jumping, after the target option is selected, the motion manner instructed to be executed by the triggering operation received by the terminal device and performed on the operation control is jumping, which means that the triggering operation can control the virtual object to move in the motion manner of jumping with respect to be climbable obstacle.

In some embodiments, the terminal device may further receive the triggering operation performed on the operation control in the following way: displaying operation indication information, the operation indication information being used for indicating a motion manner used by the virtual object on the climbable obstacle; and receiving, on the basis of the operation indication information, the triggering operation performed on the operation control, the triggering operation corresponding to the motion manner indicated by the operation indication information.

When the distance between the virtual object and the climbable obstacle is less than a target distance, that is, when the virtual object is close to the climbable obstacle, the operation indication information is displayed, and the operation indication information is used for indicating which motion manner the virtual object needs to use with respect to the climbable obstacle and how to trigger the corresponding motion manner. The user can perform the corresponding triggering operation on the operation control according to an operation manner indicated by the operation indication information.

Figure 8:
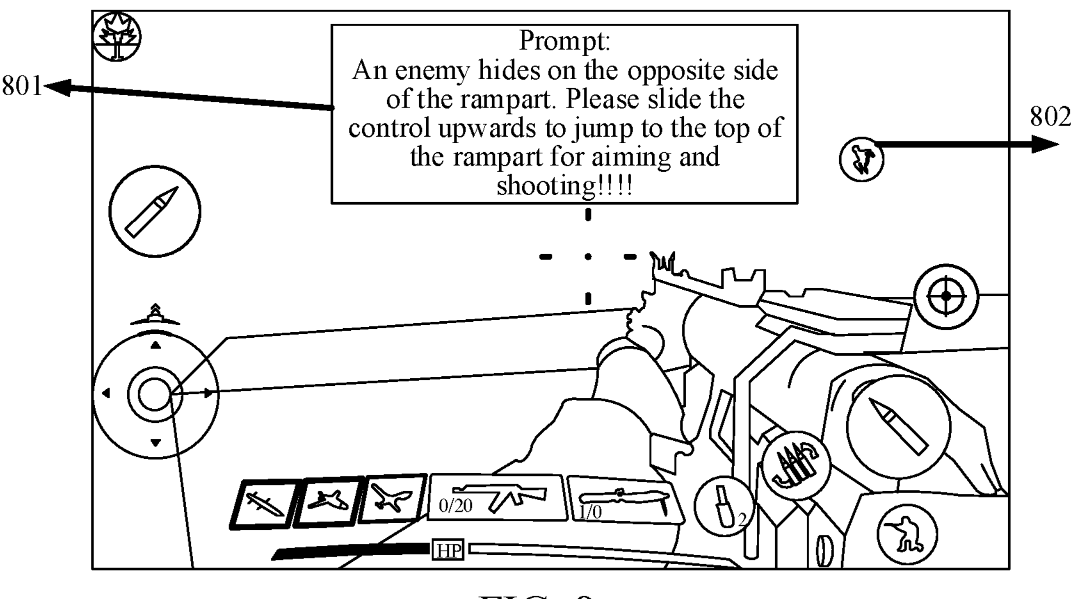
FIG. 8 is a schematic diagram of displaying of operation indication information according to an embodiment of this application.

Referring to FIG. 8, FIG. 8 is a schematic diagram of displaying of operation indication information according to an embodiment of this application. When the virtual object is close to an obstacle, namely, a rampart, operation indication information 801 of "An enemy hides on the opposite side of the rampart. Please slide the control upwards to jump to the top of the rampart for aiming and shooting". After the user slides an operation control 802 upwards according to the information indicated by the operation indication information 801, if the terminal device determines that this received upward sliding operation performed on the operation control corresponds to the target motion manner of jumping, the terminal device can control the virtual object to jump to the top of the rampart to aim at the enemy.

In some embodiments, the terminal device can also obtain scene data in the virtual scene before displaying the operation indication information; and invoke, according to the scene data, a machine learning model to predict a motion manner used by the virtual object on the climbable obstacle, and determines the predicted motion manner as the motion manner indicated by the operation indication information.

The machine learning model is trained on the basis of scene data of samples and a labeled motion manner. After adjusting the operation mode of the at least two motion manners associated with the operation control to the split mode, the terminal device predicts a relatively appropriate motion manner for the virtual object with respect to the climbable obstacle on the basis of the scene data (for example, position data of a region where the current virtual object or another virtual object is located, interaction data between the current virtual object and another virtual object, and position information of climbable obstacle) in the virtual scene by using the artificial intelligence algorithm-based machine learning model, so that a prediction result is more accurate, and the triggering operation performed by the user on the basis of the operation indication information can trigger the relatively appropriate motion manner, to control the virtual object to use the appropriate motion manner with respect to the climbable obstacle, which improves the effectiveness of control of motion manners.

The above-mentioned machine learning model may be a neural network model (for example, a convolutional neural network, a deep convolutional neural network, a fully connected neural network, or the like), a decision tree model, a gradient lifting tree, a multilayer perceptron, a support vector machine, and the like. This embodiment of this application does not limit the type of the machine learning model.

In some embodiments, the terminal device obtains scene data in the virtual scene, and reference scene data corresponding to the target motion manner before displaying the operation indication information; and matches the scene data with the reference scene data, and determines, when the scene data matches the reference scene data, the target motion manner as the motion manner indicated by the operation indication information.

In the case that the operation control is associated with various motion manners, each motion manner has corresponding reference scene data, and different motion manners correspond to different reference scene data. For example, the reference scene data corresponding to the motion manner of "jumping" is different from the reference scene data corresponding to the motion manner of climbing. When the virtual object is close to the climbable obstacle, the terminal device obtains current scene data, matches the obtained scene data with the reference scene data corresponding to each of the various motion manners associated with the operation control, and selects the motion manner corresponding to the successfully matched reference scene data as the motion manner indicated by the operation indication information. After the user performs the corresponding triggering operation according to the operation indication information, the terminal device compares the motion manner indicated by the triggering operation with the target motion manner; determines, when the two motion manners are consistent, that the triggering operation corresponds to the target motion manner, and controls the virtual object to move in the target motion manner with respect to the climbable obstacle; and determines, when the two motion manners are inconsistent, that the triggering operation does not correspond to the target motion manner. In this case, the terminal device may control the virtual object to move in the motion manner indicated by the triggering operation with respect to the climbable obstacle.

Of course, in practical applications, after obtaining the current scene data, the terminal device may directly match the obtained scene data with the reference scene data corresponding to the target motion manner among the various motion manners associated with the operation control. When the matching succeeds, the terminal device may determine that the target motion manner is the motion manner indicated by the operation indication information, and directly control the virtual object to move in the target motion manner with respective to the climbable obstacle. When the matching fails, the terminal device may match the obtained scene data with the reference scene data corresponding to each of the various motion manners associated with the operation control in the above way, to determine that the target motion manner is not the motion manner indicated by the operation indication information, and may screen out the motion manner corresponding to the successfully matched reference scene data as the motion manner indicated by the operation indication information.

It can be understood that the scene data related to the virtual scene in this embodiment of this application is essentially user-related data. When this embodiment of this application is applied to a product or a technology, it is necessary to obtain user's permission or consent, and the acquisition, use, and processing of the related data need to comply with relevant laws, regulations, and standards of relevant countries and regions.

When it is determined that the triggering operation corresponds to the target motion manner, the virtual object can be controlled to move with respect to the climbable obstacle in the target motion manner indicated by the triggering operation. If the target motion manner is jumping, the virtual object can be controlled to move in the motion manner of jumping with respect to the climbable obstacle, so as to jump from one side of the climbable obstacle and stand on the climbable obstacle. If the target motion manner is climbing, the virtual object can be controlled to move in the motion manner of climbing with respect to the climbable obstacle, so as to climb from one side of the climbable obstacle to the other side.

According to the above manner, if the distance between the virtual object and the climbable obstacle is less than the target distance, that is, when the virtual object is close to the climbable obstacle, using which motion manner by the virtual object on the climbable obstacle is completely decided by a player according to the triggering operation performed on the operation control, so that the initiative of the player is improved, and the used motion manner complies with the wish of the player, which avoids a situation that deciding a motion manner by a system is against the will of the player and requires frequent operations, and improves the effectiveness of control of motion manners. Interaction operations of virtual objects in a virtual scene can be assisted, thereby improving the interaction efficiency.

An exemplary application of this embodiment of this application in a practical application scene will be explained below. By way of example, the virtual scene is a game. The motion manners associated with the operation control include jumping and climbing. The motion processing method in a virtual scene according to this embodiment of this application is continued to be explained. This embodiment of this application focuses on optimizing the following experiences: adding a new operation of ON/OFF control and adding functions of triggering jumping and climbing by a sliding distance, which will be explained one by one below.

1. Add a New Operation of ON/OFF Control

As shown in FIG. 4, ON/OFF options used for setting the operation modes of the two motion manners associated with the operation control are displayed in the setting interface. When OFF is selected, the operation mode is adjusted to the combined mode, and when ON is selected, the operation mode is adjusted to the split mode. When the operation mode is adjusted to the combined mode, controlling is performed in a conventional way. That is, a function (used for controlling the motion manner of the virtual object with respect to the climbable obstacle) triggered by the user triggering the operation control is determined by the system according to a position environment of the virtual object. For example, when the distance between the virtual object and the climbable object is less than the target distance (that is, the virtual object is close to the climbable obstacle), if the terminal device receives the triggering operation performed on the operation control, the terminal device triggers the climbing function to control the virtual object to move in the motion manner of climbing with respect to the climbable obstacle, that is, controls the virtual object to climb from one side of the climbable obstacle to the other side. For another example, when the virtual object moves on a flat ground or the distance between the virtual object and the climbable obstacle exceeds the target distance (the virtual object cannot climb over the climbable obstacle), if the terminal device receives the triggering operation performed on the operation control, the terminal device triggers the jumping function to control the virtual object to move in the motion manner of jumping.

When the operation mode is adjusted to the split mode, the function triggered by the user triggering the operation control is decided by the triggering operation performed by the user on the operation control. If the triggering operation corresponds to which motion manner, the function corresponding to this motion manner is triggered to control the virtual object to move in the corresponding motion manner with respect to the climbable obstacle. For example, when the distance between the virtual object and the climbable obstacle is less than the target distance (namely, the virtual object is close to the climbable obstacle), the triggering operation corresponds to the motion manner of jumping, and the jumping function is triggered to control the virtual object to move in the motion manner of jumping with respect to the climbable obstacle, that is, to control the virtual object to jump from one side of the climbable obstacle and stand on the climbable obstacle. If the triggering operation corresponds to the motion manner of climbing, the climbing function is triggered to control the virtual object to move in the motion manner of climbing with respect to the climbable obstacle, that is, to control the virtual object to climb from one side of the climbable obstacle to the other side.

2. Add Functions of Triggering Jumping and Climbing by a Sliding Distance

This function is mainly aimed at a function triggered when the virtual object is close to the climbable obstacle. When the virtual object is not close to the climbable obstacle, the jumping function is triggered while a jump button (namely, the above-mentioned operation control) is still triggered. The motion processing method in a virtual scene according this embodiment of this application mainly lies in the performance of the virtual object when it is close to the climbable obstacle. When the virtual object is close to the climbable obstacle (a wall), the climbing function is triggered immediately by pressing the jump button in the previous design, but in this application, no function is triggered by pressing the jump button. In this case, the jump button is highlighted, and the corresponding function is triggered according to a sliding operation of a finger when the jump button pops up. If the player moves the finger away immediately or the sliding distance of the finger is less than a preset distance threshold (the above-mentioned first distance threshold), the jumping function is triggered. If the sliding distance of the finger of the player is greater than the distance threshold, the jump button will become a climb button. If the player moves the finger away immediately, the climbing function will be triggered. If the player intends to cancel the climbing function, one way is to stay away from the climbable obstacle (for example, make the distance therebetween exceed the target distance) in the process that the player presses the climb button, and the climb button will become the jump button. In this case, the jumping function will be triggered if the player moves the finger away.

Another way is to move the sliding distance of the finger towards a pressing position. When the sliding distance is less than the preset distance threshold, the climb button will become the jump button. In this case, the jumping function will be triggered if the player moves the finger away.

Figure 9:
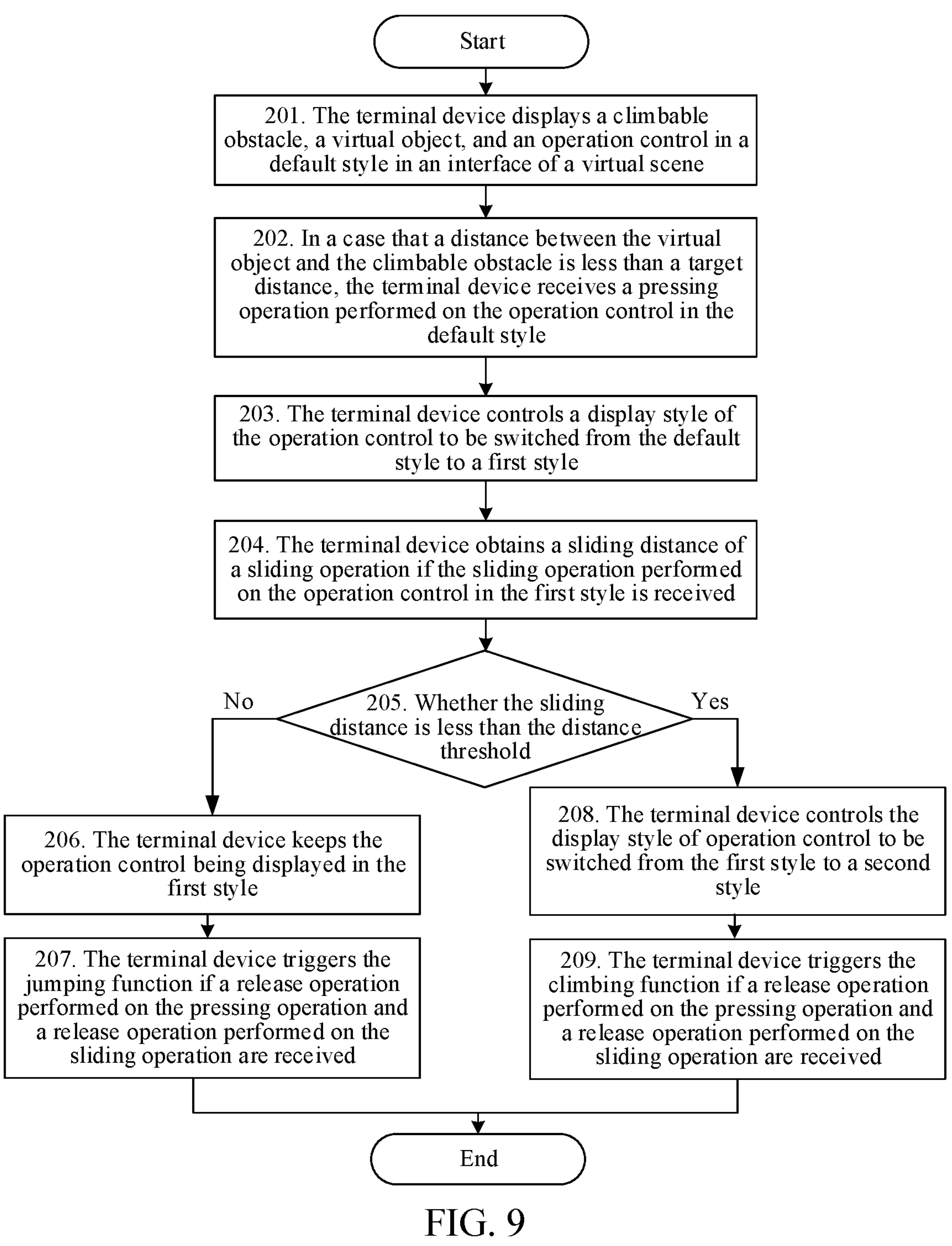
FIG. 9 is a schematic diagram of a motion processing method in a virtual scene according to an embodiment of this application.

Based on the above explanation, referring to FIG. 9, FIG. 9 is a schematic diagram of a motion processing method in a virtual scene according to an embodiment of this application. The method includes:

Step 201: The terminal device displays a climbable obstacle, a virtual object, and an operation control in a default style in an interface of a virtual scene.

The operation control is used for controlling a motion manner of the virtual object with respect to the climbable obstacle. An icon displayed in a display region of the operation control in the default style (for example, gray) is a jump icon.

Figure 10:
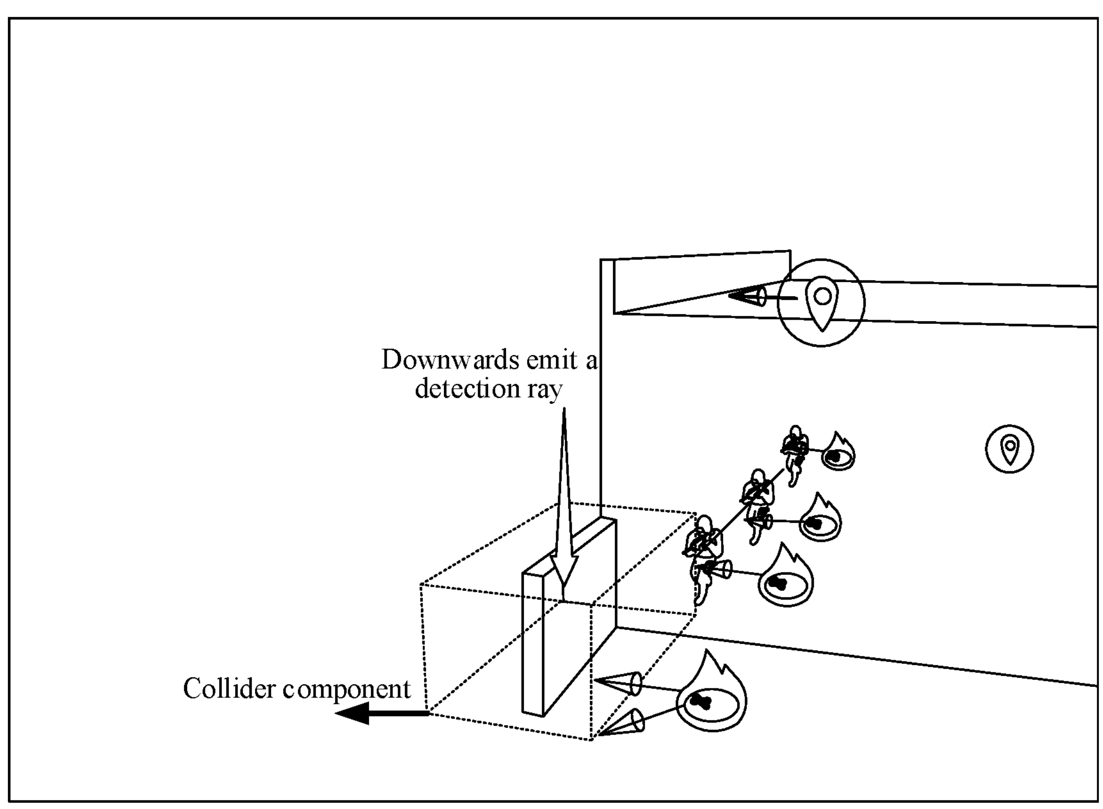
FIG. 10 is a schematic diagram of detection according to an embodiment of this application.

A plurality of obstacles can be displayed in the interface of the virtual scene. The climbable obstacle is an obstacle that the virtual object can jump onto or climb over. In practical applications, whether an obstacle is a climbable obstacle can be determined by detecting a relationship between a vertical height of the obstacle and a maximum height that the virtual object can jump or climb. Referring to FIG. 10, FIG. 10 is a schematic diagram of detection according to an embodiment of this application. Each obstacle is bound with a collider component (for example, a collision box and a collision ball). A detection ray is emitted from a camera component bound at a top of the obstacle to the collider component at a lower end of the obstacle. When the detection ray encounters the collider component at the lower end of the obstacle, the vertical height of the obstacle is determined on the basis of a length of the detection ray. When the vertical height does not exceed the maximum height that the virtual object can jump or climb, it is determined that the obstacle is a climbable obstacle. When the vertical height is greater than the maximum height that the virtual object can jump or climb, it is determined that the obstacle is a non-climbable obstacle.

Step 202: When a distance between the virtual object and the climbable obstacle is less than a target distance, the terminal device receives a pressing operation performed on the operation control in the default style.

Step 203: The terminal device controls a display style of the operation control to be switched from the default style to a first style.

For example, if the pressing operation performed on the operation control in the default style is received, the terminal device controls the display style of the operation control to be switched from the default style to the first style. For example, the display style of the operation control is switched from the gray style to a highlighted style, and the icon displayed in the display region of the operation control in the first style is still the jump icon.

Step 204: The terminal device obtains a sliding distance of a sliding operation if the sliding operation performed on the operation control in the first style is received.

In the process of performing the pressing operation on the operation control in the first style, the user can perform the sliding operation on the operation control in the first style. If the terminal device receives the sliding operation performed on the operation control in the first style, the terminal device obtains the sliding distance of the sliding operation in real time, so as to determine which function is triggered according to the sliding distance.

Figure 11:
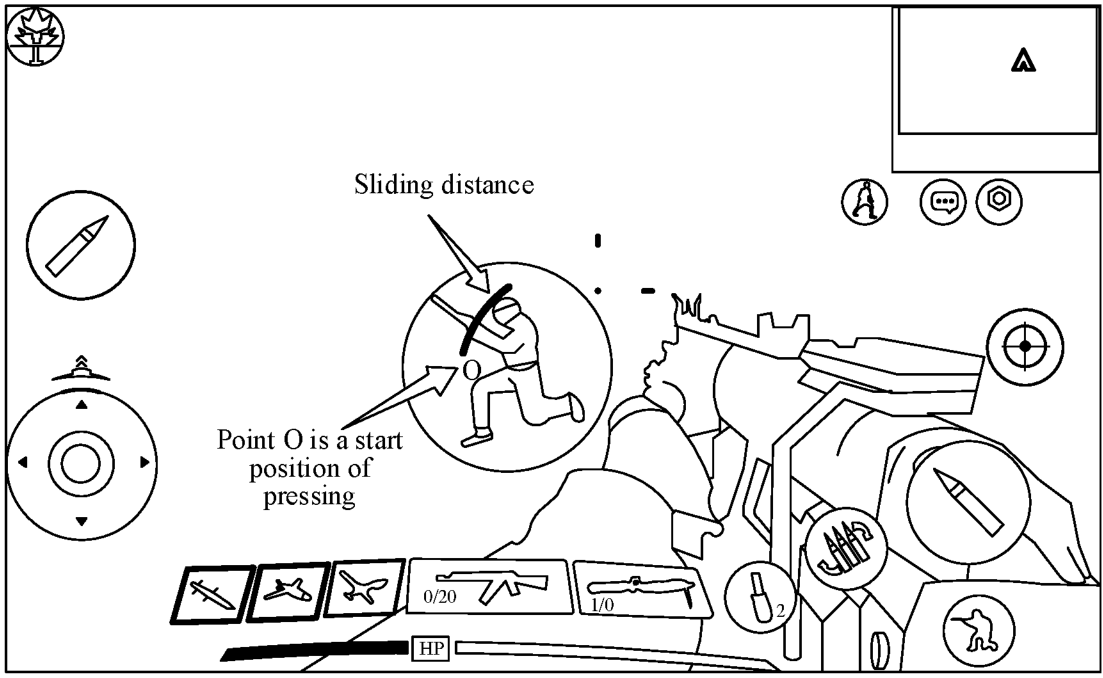
FIG. 11 is a schematic diagram of sliding according to an embodiment of this application.

Referring to FIG. 11, FIG. 11 is a schematic diagram of sliding according to an embodiment of this application. When the player presses the operation control in the first style, an initial position 0 of the pressing operation is obtained, and a circular region formed by a circle made by taking the initial position 0 as a circle center with a distance threshold is a sensing region for triggering the sliding operation. The distance threshold is used for distinguishing triggering the jumping function or the climbing function. A sliding operation within the circular region triggers the jumping function, and a sliding operation beyond the circular region triggers the climbing function.

In the sliding process, a sliding position A corresponding to the sliding operation is obtained in real time, and a distance between the sliding position A and the initial position 0 is obtained as a sliding distance of the sliding operation.

Step 205: The terminal device determines whether the sliding distance is less than the distance threshold.

If the sliding distance is less than the distance threshold, step 206 is executed. If the sliding distance is not less than the distance threshold, step 208 is executed.

Step 206: The terminal device keeps the operation control being displayed in the first style.

Step 207: The terminal device triggers the jumping function if a release operation following the pressing operation and a release operation performed on the sliding operation are received.

Figure 12:
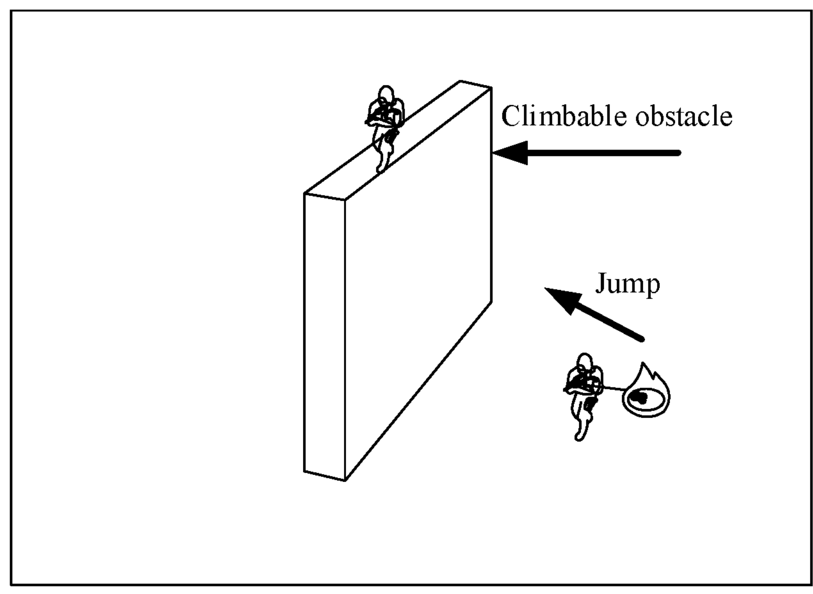
FIG. 12 is a schematic diagram of motion according to an embodiment of this application.

In the process of sliding the operation control in the first style, if the player moves the finger away when the sliding distance is less than the distance threshold, the terminal device may receive the release operation following the pressing operation and the release operation performed on the sliding operation, and triggers, in response to the release operations, the jumping function to control the virtual object to move in the motion manner of jumping with respect to the climbable obstacle. As shown in FIG. 12, FIG. 12 is a schematic diagram of motion according to an embodiment of this application, and the virtual object is controlled to jump from one side of the climbable obstacle and stand on top of the climbable obstacle.

Step 208: The terminal device controls the display style of operation control to be switched from the first style to a second style.

If the sliding distance is not less than the distance threshold, the terminal device controls the display style of the control operation control to be switched from the first style to the second style. For example, the terminal device controls the icon displayed in the display region of the operation control to be switched from the jump icon to the climb icon and highlights the ion.

Step 209: The terminal device triggers the climbing function if a release operation following the pressing operation and a release operation performed on the sliding operation are received.

Figure 13:
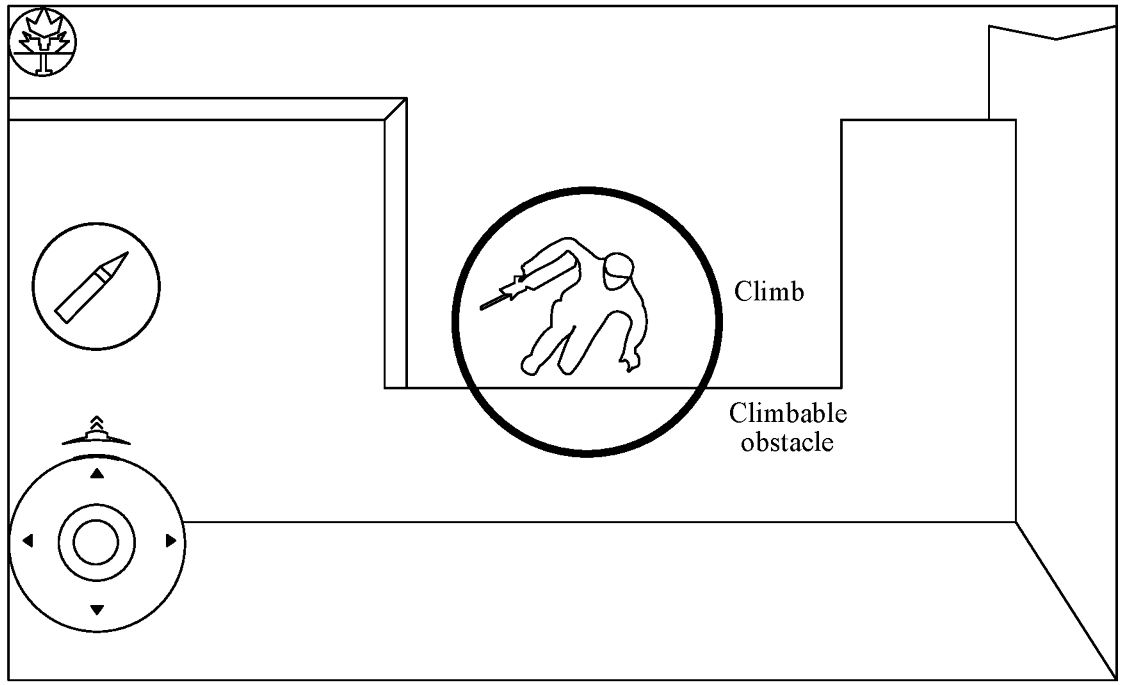
FIG. 13 is a schematic diagram of motion according to an embodiment of this application.

In the process of sliding the operation control in the second style, if the player moves the finger away when the sliding distance is not less than the distance threshold, the terminal device may receive the release operation following the pressing operation and the release operation performed on the sliding operation, and triggers, in response to the release operations, the climbing function to control the virtual object to move in the motion manner of climbing with respect to the climbable obstacle. As shown in FIG. 13, FIG. 13 is a schematic diagram of motion according to an embodiment of this application, and the virtual object is controlled to climb from one side of the climbable obstacle to the other side.

According to the above manner, if the distance between the virtual object and the climbable obstacle is less than the target distance, that is, when the virtual object is close to the climbable obstacle, using which motion manner by the virtual object on the climbable obstacle is completely decided by a player according to the triggering operation performed on the operation control, so that the initiative of the player is improved, and the used motion manner complies with the wish of the player, which avoids a situation that deciding a motion manner by a system according to an environment is against the will of the player and requires frequent operations, and improves the effectiveness of control of motion manners. Interaction operations of virtual objects in a virtual scene can be assisted, thereby improving the interaction efficiency.

The following continues to explain an exemplary structure that the motion processing apparatus 465 in a virtual scene according to the embodiments of this application is implemented as software modules. In some embodiments, the software modules, stored in the memory 460 in FIG. 2, in the motion processing device 465 in a virtual scene may include:

a display module 4651, configured to display a climbable obstacle, a virtual object, and an operation control of a virtual scene, the operation control being used for controlling a motion manner of the virtual object to move over the climbable obstacle;

the operation control being associated with at least two motion manners, and different triggering operations performed on the operation control corresponding to different motion manners; and a control module 4653, configured to: when a distance between the virtual object and the climbable obstacle is less than a target distance, control, in response to a triggering operation performed on the operation control, the virtual object to move over the climbable obstacle in a target motion manner corresponding to the triggering operation.

In some embodiments, the apparatus further includes a receiving module 4652, configured to receive, when a distance between the virtual object and the climbable obstacle is less than a target distance, a triggering operation performed on the operation control.

In some embodiments, the apparatus further includes: a setting module, configured to adjust an operation mode of the at least two motion manners associated with the operation control to be a split mode in response to a setting instruction for the operation mode of the operation control. The apparatus further includes: a triggering module, configured to trigger, in the split mode, the triggering operation to be matched with a triggering operation corresponding to the target motion manner among the at least two motion manners.

In some embodiments, the receiving module is further configured to control, in response to a pressing operation performed on the operation control, a display style of the operation control to be switched from a default style to a first style, the first style corresponding to the target motion manner; and receive the triggering operation on the basis of a release operation following the pressing operation and triggered by the operation control in the first style, the triggering operation including the pressing operation and the release operation.

In some embodiments, the triggering operation further includes a first sliding operation, and the apparatus further includes: a first release receiving module, configured to: receive, during performing the pressing operation on the operation control in the first style, the first sliding operation triggered by the operation control in the first style; and receive, in the sliding process, a release operation following the pressing operation and a release operation following the first sliding operation.

In some embodiments, the triggering operation further includes a second sliding operation, and the apparatus further includes: a second release receiving module, configured to: receive, during performing the pressing operation on the operation control in the first style, the second sliding operation triggered by the operation control in the first style; in the sliding process, control, in response to a sliding distance of the second sliding operation being not less than a first distance threshold, the display style of the operation control to be switched from the first style to a second style, the second style corresponding to another motion manner among the at least two motion manners except the target motion manner; and receive, during displaying the operation control in the second style, a release operation following the pressing operation and a release operation following the second sliding operation, the release operations being triggered by the operation control in the second style.

In some embodiments, the triggering operation further includes a callback operation, and the second release receiving module is further configured to: receive, during performing the pressing operation and the second sliding operation on the operation control in the second style, the callback operation performed on the second sliding operation; control, in a callback process in response to a callback distance of the callback operation exceeding a second distance threshold, the display style of the operation control to be restored from the second style to the first style; and receive, during displaying the operation control in the first style, a release operation following the pressing operation, a release operation following the second sliding operation, and a release operation performed on the callback operation.

In some embodiments, the second release receiving module is further configured to: during performing the pressing operation and the second sliding operation on the operation control in the second style, control, in response to a moving instruction performed on the virtual object, the virtual object to move in the virtual scene along a direction indicated by the moving instruction; control, in the moving process in response to the distance between the virtual object and the climbable obstacle being not less than the target distance, the display style of the operation control to be restored from the second style to the first style; and receive, during displaying the operation control in the first style, a release operation following the pressing operation and a release operation following the second sliding operation.

In some embodiments, after the second release receive module controls the display style of the operation control to be switched from the first style to the second style, the apparatus further includes: other control modules, configured to control, in response to the release operation following the pressing operation of the operation control in the second style and the release operation following the second sliding operation, the virtual object to move in the another motion manner with respect to the climbable obstacle.

In some embodiments, the apparatus further includes: a first determining module, configured to: obtain a distance between a position corresponding to the pressing operation and a position corresponding to the release operation; and determine, when the distance is less than a first distance threshold, that the triggering operation corresponds to the target motion manner.

In some embodiments, the apparatus further includes: a second determining module, configured to: obtain pressing parameters corresponding to the pressing operation when the triggering operation comprises a pressing operation performed on the operation control, the pressing parameters comprising at least one of the following: a pressing duration, pressing strength, and a pressing frequency; and determine, when the pressing parameters match a target pressing parameter corresponding to the target motion manner, that the triggering operation corresponds to the target motion manner.

In some embodiments, the apparatus further includes: a third determining module, configured to: obtain a sliding trajectory corresponding to the sliding operation when the triggering operation includes a sliding operation performed on the operation control; and determine, when the sliding trajectory matches a target sliding trajectory corresponding to the target motion manner, that the triggering operation corresponds to the target motion manner.

In some embodiments, the receiving module is further configured to: display, in response to a pressing operation performed on the operation control, options corresponding to various motion manners of the at least two motion manners; and receive the triggering operation in response to a selection operation performed on a target option, and determine a motion manner corresponding to the target option as the motion manner instructed to be executed by the triggering operation.

In some embodiments, the receiving module is further configured to: display operation indication information, the operation indication information being used for indicating a motion manner used by the virtual object on the climbable obstacle; and receive the triggering operation performed according to the operation indication information on the operation control.

In some embodiments, the apparatus further includes: a prediction module, configured to: obtain scene data in the virtual scene; and invoke, according to the scene data, a machine learning model to predict a motion manner used by the virtual object on the climbable obstacle, and determine the predicted motion manner as the motion manner indicated by the operation indication information, the machine learning model being obtained by training based on scene data of samples and a labeled motion manner.

In some embodiments, the apparatus further includes: a matching module, configured to: obtain scene data in the virtual scene, and reference scene data corresponding to the target motion manner; and match the scene data with the reference scene data, and determine, when the scene data matches the reference scene data, the target motion manner as the motion manner indicated by the operation indication information.

The embodiments of this application provide a computer program product or a computer program. The computer program product or computer program includes computer instructions which are stored in a non-transitory computer-readable storage medium. A processor of a computer device reads the computer instructions from the computer-readable storage medium and executes the computer instructions, causing the computer device to implement the above-mentioned motion processing method in a virtual scene in the embodiments of this application.

The embodiments of this application provide a non-transitory computer-readable storage medium which stores executable instructions. When the executable instructions are executed by a processor, the processor is caused to implement the motion processing method in a virtual scene in the embodiments of this application, for example, the method as shown in FIG. 3.

In some embodiments, the computer-readable storage medium may be a memory such as a read-only memory (ROM), a random access memory (RAM), an erasable programmable read-only memory (EPROM), an electrically erasable programmable read-only memory (EEPROM), a flash memory, a magnetic surface memory, an optic disc, or a compact disc read-only memory (Compact Disc Read-Only Memory, CD-ROM). The computer-readable storage medium may include one or any combination of the aforementioned memories.

In some embodiments, the executable instructions may be in the form of programs, software, software modules, scripts, or codes, written in any form of programming language (including a compiling or interpreting language, or a declarative or procedural language), and may be deployed in any form, including being deployed as standalone programs or as modules, components, subroutines, or other units suitable for use in computing environments.

As an example, the executable instructions may, but may not necessarily correspond to files in a file system, and may be stored as part of a file that stores other programs or data, such as in one or more scripts stored in a Hyper Text Markup Language (HTML) document, in a single file dedicated to a discussed program, or in multiple collaborative files (such as files that store one or more modules, subroutines, or codes).

As an example, the executable instructions may be deployed on one computing device for execution, or on a plurality of computing devices located at one site, or on a plurality of computing devices distributed at a plurality of sites and interconnected by a communication network. In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

The foregoing descriptions are merely embodiments of this application and are not intended to limit the protection scope of this application. Any modification, equivalent replacement, and improvement made within the spirit and scope of this application shall fall within the protection scope of this application.

What is claimed is:

1. A motion processing method in a virtual scene performed by an electronic device and the method comprising:

displaying a virtual scene including a climbable obstacle, a virtual object, and an operation control, the operation control being associated with at least two triggering operations for controlling the virtual object to move over the climbable obstacle in at least two different motion manners;

receiving a triggering operation including a pressing operation performed on the operation control, a sliding operation during the pressing operation, and a release operation following the sliding operation;

in response to the pressing operation performed on the operation control, changing a display style of the operation control from a default style to a first style corresponding to a first motion manner of the at least two different motion manners;

while continuously detecting the sliding operation during the pressing operation:

in response to detecting a current sliding distance of the sliding operation being less than a first distance threshold, maintaining displaying the operation control in the first style;

in response to detecting the current sliding distance of the sliding operation being no less than the first distance threshold, switching the display style of the operation control from the first style to a second style corresponding to a second motion manner of the at least two different motion manners; and in response to the release operation:

determining a final sliding distance of the sliding operation;

determining, among the at least two different motion manners, a target motion manner corresponding to the triggering operation according to the final sliding distance of the sliding operation when a distance between the virtual object and the climbable obstacle is less than a target distance; and controlling the virtual object to move over the climbable obstacle in the target motion manner corresponding to the triggering operation.

2. The method according to claim 1, wherein the method further comprises:

in response to the release operation following the pressing operation, determining the triggering operation on the basis of the operation control in the first style in accordance with the pressing operation and the release operation.

3. The method according to claim 2, wherein the method further comprises:

during the pressing operation on the operation control in the first style, receiving the sliding operation comprising a first sliding operation performed on the operation control; and receiving, during the first sliding operation on the operation control, receiving the release operation following the first sliding operation.

4. The method according to claim 3, wherein the method further comprises:

during the pressing operation on the operation control in the first style, receiving the sliding operation comprising a second sliding operation performed on the operation control; and during the second sliding operation on the operation control, switching the display style of the operation control from the first style to the second style when the current sliding distance of the second sliding operation is no less than the first distance threshold; and during displaying the operation control in the second style, receiving the release operation following the pressing operation and a release operation following the second sliding operation.

5. The method according to claim 2, wherein the determining the triggering operation on the basis of the operation control in the first style in accordance with the pressing operation and the release operation further comprises:

obtaining the final sliding distance between a position corresponding to the pressing operation and a position corresponding to the release operation; and determining, among the at least two triggering operations, the triggering operation that corresponds to the target motion manner when the final sliding distance is less than the first distance threshold.

6. The method according to claim 1, wherein the method further comprises:

obtaining pressing parameters of the pressing operation, the pressing parameters comprising at least one of the following: a pressing duration, pressing strength, and a pressing frequency; and when the pressing parameters match a target pressing parameter of the target motion manner, determining, among the at least two triggering operations, the triggering operation that corresponds to the target motion manner.

7. The method according to claim 1, wherein the method further comprises:

obtaining a sliding trajectory of the sliding operation; and when the sliding trajectory matches a target sliding trajectory of the target motion manner, determining, among the at least two triggering operations, the triggering operation that corresponds to the target motion manner.

8. The method according to claim 1, wherein the method further comprises:

in response to the pressing operation performed on the operation control, displaying options corresponding to the at least two motion manners; and receiving the triggering operation in response to a selection operation performed on a target option, and determining a motion manner corresponding to the target option as the target motion manner.

9. An electronic device, comprising:

a processor, a memory, and executable instructions stored in the memory; and the executable instructions, when executed by the processor, causing the electronic device to perform a motion processing method in a virtual scene including:

displaying a virtual scene including a climbable obstacle, a virtual object, and an operation control, the operation control being associated with at least two triggering operations for controlling the virtual object to move over the climbable obstacle in at least two different motion manners;

receiving a triggering operation including a pressing operation performed on the operation control, a sliding operation during the pressing operation, and a release operation following the sliding operation;

in response to the pressing operation performed on the operation control, changing a display style of the operation control from a default style to a first style corresponding to a first motion manner of the at least two different motion manners;

while continuously detecting the sliding operation during the pressing operation:

in response to detecting a current sliding distance of the sliding operation being less than a first distance threshold, maintaining displaying the operation control in the first style;

in response to detecting the current sliding distance of the sliding operation being no less than the first distance threshold, switching the display style of the operation control from the first style to a second style corresponding to a second motion manner of the at least two different motion manners; and in response to the release operation:

determining a final sliding distance of the sliding operation;

determining, among the at least two different motion manners, a target motion manner corresponding to the triggering operation according to the final sliding distance of the sliding operation when a distance between the virtual object and the climbable obstacle is less than a target distance; and controlling the virtual object to move over the climbable obstacle in the target motion manner corresponding to the triggering operation.

10. The electronic device according to claim 9, wherein the method further comprises:

in response to the release operation following the pressing operation, determining the triggering operation on the basis of the operation control in the first style in accordance with the pressing operation and the release operation.

11. The electronic device according to claim 10, wherein the method further comprises:

during the pressing operation on the operation control in the first style, receiving the sliding operation comprising a first sliding operation performed on the operation control; and receiving, during the first sliding operation on the operation control, receiving the release operation following the first sliding operation.

12. The electronic device according to claim 11, wherein the method further comprises:

during the pressing operation on the operation control in the first style, receiving the sliding operation comprising a second sliding operation performed on the operation control; and during the second sliding operation on the operation control, switching the display style of the operation control from the first style to the second style when the current sliding distance of the second sliding operation is no less than the first distance threshold; and during displaying the operation control in the second style, receiving the release operation following the pressing operation and a release operation following the second sliding operation.

13. The electronic device according to claim 10, wherein the determining the triggering operation on the basis of the operation control in the first style in accordance with the pressing operation and the release operation further comprises:

obtaining the final sliding distance between a position corresponding to the pressing operation and a position corresponding to the release operation; and determining, among the at least two triggering operations, the triggering operation that corresponds to the target motion manner when the final sliding distance is less than the first distance threshold.

14. The electronic device according to claim 9, wherein the method further comprises:

obtaining pressing parameters of the pressing operation, the pressing parameters comprising at least one of the following: a pressing duration, pressing strength, and a pressing frequency; and when the pressing parameters match a target pressing parameter of the target motion manner, determining, among the at least two triggering operations, the triggering operation that corresponds to the target motion manner.

15. The electronic device according to claim 9, wherein the method further comprises:

obtaining a sliding trajectory of the sliding operation; and when the sliding trajectory matches a target sliding trajectory of the target motion manner, determining, among the at least two triggering operations, the triggering operation that corresponds to the target motion manner.

16. The electronic device according to claim 9, wherein the method further comprises:

in response to the pressing operation performed on the operation control, displaying options corresponding to the at least two motion manners; and receiving the triggering operation in response to a selection operation performed on a target option, and determining a motion manner corresponding to the target option as the target motion manner.

17. A non-transitory computer-readable storage medium, storing executable instructions, and the executable instructions, when executed by a processor of an electronic device, causing the electronic device to perform a motion processing method in a virtual scene including:

displaying a virtual scene including a climbable obstacle, a virtual object, and an operation control, the operation control being associated with at least two triggering operations for controlling the virtual object to move over the climbable obstacle in at least two different motion manners;

receiving a triggering operation including a pressing operation performed on the operation control, a sliding operation during the pressing operation, and a release operation following the sliding operation;

in response to the pressing operation performed on the operation control, changing a display style of the operation control from a default style to a first style corresponding to a first motion manner of the at least two different motion manners;

while continuously detecting the sliding operation during the pressing operation:

in response to detecting a current sliding distance of the sliding operation being less than a first distance threshold, maintaining displaying the operation control in the first style;

in response to detecting the current sliding distance of the sliding operation being no less than the first distance threshold, switching the display style of the operation control from the first style to a second style corresponding to a second motion manner of the at least two different motion manners; and in response to the release operation:

determining a final sliding distance of the sliding operation;

determining, among the at least two different motion manners, a target motion manner corresponding to the triggering operation according to the final sliding distance of the sliding operation when a distance between the virtual object and the climbable obstacle is less than a target distance; and controlling the virtual object to move over the climbable obstacle in the target motion manner corresponding to the triggering operation.

18. The non-transitory computer-readable storage medium according to claim 17, wherein the method further comprises:

in response to the release operation following the pressing operation, determining the triggering operation on the basis of the operation control in the first style in accordance with the pressing operation and the release operation.

19. The non-transitory computer-readable storage medium according to claim 18, wherein the method further comprises:

during the pressing operation on the operation control in the first style, receiving the sliding operation comprising a first sliding operation performed on the operation control; and receiving, during the first sliding operation on the operation control, receiving the release operation following the first sliding operation.

20. The non-transitory computer-readable storage medium according to claim 18, wherein the determining the triggering operation on the basis of the operation control in the first style in accordance with the pressing operation and the release operation further comprises:

obtaining the final sliding distance between a position corresponding to the pressing operation and a position corresponding to the release operation; and determining, among the at least two triggering operations, the triggering operation that corresponds to the target motion manner when the final sliding distance is less than the first distance threshold.

* * * * *